US011686710B2

(12) United States Patent
Spay et al.

(10) Patent No.: US 11,686,710 B2
(45) Date of Patent: *Jun. 27, 2023

(54) LONGITUDINAL AND CIRCUMFERENTIAL ULTRASOUND SCANNER

(71) Applicant: Evident Canada, Inc., Québec (CA)

(72) Inventors: Benjamin Spay, Quebec (CA); Martin Dupuis, Quebec (CA); Luis Cooper, Quebec (CA); Veronique Simard, Quebec (CA)

(73) Assignee: Evident Canada, Inc., Québec (CA)

( * ) Notice: Subject to any disclaimer, the term of this patent is extended or adjusted under 35 U.S.C. 154(b) by 128 days.

This patent is subject to a terminal disclaimer.

(21) Appl. No.: 17/077,090

(22) Filed: Oct. 22, 2020

(65) Prior Publication Data

US 2021/0302382 A1    Sep. 30, 2021

Related U.S. Application Data

(60) Provisional application No. 63/002,414, filed on Mar. 31, 2020.

(51) Int. Cl.
*G01N 29/28* (2006.01)
*G01N 29/06* (2006.01)
(Continued)

(52) U.S. Cl.
CPC ........... *G01N 29/28* (2013.01); *G01N 29/041* (2013.01); *G01N 29/043* (2013.01);
(Continued)

(58) Field of Classification Search
CPC .... G01N 29/262; G01N 29/28; G01N 29/041; G01N 29/069; G01N 29/225;
(Continued)

(56) References Cited

U.S. PATENT DOCUMENTS

| 5,619,423 A | 4/1997 | Scrantz |
| 8,087,298 B1 | 1/2012 | Dimambro et al. |
| (Continued) | | |

FOREIGN PATENT DOCUMENTS

| CA | 2607653 A1 | 4/2008 |
| CA | 3000420 A1 | 4/2013 |
| (Continued) | | |

OTHER PUBLICATIONS

"International Application Serial No. PCT/CA2021/050419, International Search Report dated Jun. 17, 2021", 3 pgs.

(Continued)

*Primary Examiner* — Helen C Kwok
(74) *Attorney, Agent, or Firm* — Schwegman Lundberg & Woessner, P.A.

(57) ABSTRACT

A scanning device is provided. The scanning device includes a frame having a first portion and a second portion pivotably coupled to the first frame portion. The scanning device also has a first set of wheels coupled with the first frame portion and a second set of wheels coupled with the second frame portion. In addition, the scanning device has a rail movably disposed on the first frame portion that includes a channel and a rail along with a rail arm coupled with the channel. The scanning device has a sensor assembly that includes sensor forks, a sensor coupled with the sensor forks and a sensor arm. The sensor arm is coupled with the sensor forks and with the rail arm. In addition, the sensor is adjustable between a first position and a second position via the rail.

23 Claims, 22 Drawing Sheets

(51) Int. Cl.
*G01N 29/04* (2006.01)
*G01N 29/22* (2006.01)
*G01N 29/265* (2006.01)
*G01N 29/26* (2006.01)

(52) U.S. Cl.
CPC ......... *G01N 29/069* (2013.01); *G01N 29/225* (2013.01); *G01N 29/262* (2013.01); *G01N 29/265* (2013.01); *G01N 2291/0289* (2013.01); *G01N 2291/267* (2013.01); *G01N 2291/2634* (2013.01); *G01N 2291/2636* (2013.01)

(58) Field of Classification Search
CPC ............... G01N 29/043; G01N 29/265; G01N 2291/0289; G01N 2291/267; G01N 2291/2634; G01N 2291/2636
See application file for complete search history.

(56) References Cited

U.S. PATENT DOCUMENTS

| | | | |
|---|---|---|---|
| 8,146,430 B2 | 4/2012 | Simmons et al. | |
| 8,646,347 B2 | 2/2014 | Dubbeldam | |
| 9,863,919 B2 | 1/2018 | Carrasco Zanini et al. | |
| 2005/0223807 A1 | 10/2005 | Bardoux et al. | |
| 2007/0175282 A1 | 8/2007 | Fetzer et al. | |
| 2007/0227250 A1 | 10/2007 | Kennedy et al. | |
| 2009/0114026 A1 | 5/2009 | Simmons et al. | |
| 2009/0145249 A1 | 6/2009 | Dubbeldam | |
| 2009/0178465 A1* | 7/2009 | Ethridge | G01N 29/225 367/13 |
| 2009/0316531 A1 | 12/2009 | Brignac | |
| 2011/0126626 A1 | 6/2011 | Koch et al. | |
| 2011/0277549 A1 | 11/2011 | Frederick et al. | |
| 2013/0014571 A1 | 1/2013 | Quinones et al. | |
| 2014/0076053 A1 | 3/2014 | Gaudet et al. | |
| 2014/0102201 A1* | 4/2014 | Brignac | G01N 29/225 73/592 |
| 2014/0238136 A1* | 8/2014 | Ten Grotenhuis | G01N 29/262 73/592 |
| 2017/0059531 A1* | 3/2017 | Fetzer | B64F 5/60 |
| 2018/0117718 A1 | 5/2018 | Rajagopalan et al. | |
| 2018/0180577 A1 | 6/2018 | Kenny et al. | |
| 2018/0372693 A1* | 12/2018 | Spay | G01N 29/265 |
| 2019/0128850 A1 | 5/2019 | Brignac et al. | |
| 2019/0128856 A1* | 5/2019 | Spay | G01N 29/265 |
| 2019/0323994 A1* | 10/2019 | Armitt | G01N 29/043 |
| 2020/0262077 A1 | 8/2020 | Bryner et al. | |
| 2021/0094186 A1* | 4/2021 | Wehlin | B25J 9/1664 |
| 2021/0302390 A1* | 9/2021 | Spay | G01N 29/225 |

FOREIGN PATENT DOCUMENTS

| | | |
|---|---|---|
| CN | 206876651 U | 1/2018 |
| WO | WO-2021195759 A1 | 10/2021 |
| WO | WO-2021195769 A1 | 10/2021 |

OTHER PUBLICATIONS

"International Application Serial No. PCT/CA2021/050419, Written Opinion dated Jun. 17, 2021", 3 pgs.
"International Application Serial No. PCT/CA2021/050429, International Search Report dated Jun. 17, 2021", 3 pgs.
"International Application Serial No. PCT/CA2021/050429, Written Opinion dated Jun. 17, 2021", 5 pgs.
"U.S. Appl. No. 17/077,116, Non Final Office Action dated Jun. 29, 22", 10 pgs.
"U.S. Appl. No. 17/077,116, Response filed Sep. 29, 2022 to Non Final Office Action dated Jun. 29, 2022", 12 pgs.

\* cited by examiner

LONGITUDINAL AND CIRCUMFERENTIAL ULTRASOUND SCANNER

CLAIM FOR PRIORITY

The present application claims priority to Application No. 63/002,414 filed on Mar. 31, 2020, the contents of which are incorporated herein in their entirety.

TECHNICAL FIELD

This document pertains generally, but not by way of limitation, to a device for inspecting joints in a surface. More specifically, but not by way of limitation, the present application relates to inspecting weld joints formed in cylindrical surfaces.

BACKGROUND

Structures such as pipelines that serve as a conduits for pressurized fluids, such as a natural gas line or an oil line, or the like, can fail, and such structures may be repaired using various welding techniques. For example, if repairs are made along an axial section, such as a longitudinal section of a pipe for a natural gas line, the pipe can be welded in an axial direction. In the example of a pipe, if a repair is made that necessitated cutting through a diameter of the pipe (e.g. about the pipe radially), or to insert a replacement section, a circumferential weld can be made along the pipe. However, in the case of pressure vessels or metal pipes that are conduits for fluids, the welds should not have fissures or other flaws or exhibit material weaknesses that could lead to failure of the welds.

SUMMARY

In order to ascertain the integrity of the welds, various nondestructive testing (NDT) techniques, such as ultrasonic testing with phased array sensors, have been used to test welds. NDT can be used to detect discontinuities within the internal structure of welds. The present inventors have recognized, among other things, that a challenge exists in providing a testing apparatus that reduces or minimizes the number of adjustments made during either axial testing of a weld or circumferential testing of a weld. The present inventors developed, among other things, testing apparatus that is easily configurable for axial testing and circumferential testing, such as to address the challenge mentioned above. For example, implementations of the present disclosure address the problems noted elsewhere herein such as by providing an ultrasound scanning device having wheels that are in a specified (e.g., fixed) position along with a fixed frame. The wheels and the frame allow the ultrasound scanning device to move along a surface, such as a surface of a pipe, while the ultrasound scanning device scans a joint on or within the pipe, e.g., a weld, in a longitudinal direction of an article being inspected, such as a pipe. In an implementation, the wheels may have a fixed dome configuration. A position of the wheels and the frame are fixed such that as few as a single adjustment may be used to adapt between scanning along a longitudinal direction of an article and, in instances of circular articles, a circumference of the article. In some embodiments, no adjustments are required to adapt the scanning device between scanning along a longitudinal direction of an article and, in instances of circular articles, a circumference of the article, such as when the article has a diameter of at least sixteen inches. When a longitudinal portion of a pipe is being inspected, such as a weld that runs a length of the pipe, knobs can be adjusted in an upward or downward direction depending on the diameter of the pipe such that sensors coupled with sensor arms are positioned on to the pipe. Specifically, the sensor arms can travel along a channel when the knobs are adjusted. When the sensor arms are adjusted, a probe center defined by the phased array probes can be adjusted. In an implementation, the ultrasound scanning device can scan pipes having a diameter greater than about 6 inches. In a further implementation, the ultrasound scanning device can scan pipes having a 6-inch minimum diameter for longitudinal inspection and a 4-inch minimum diameter for circumferential inspection. In some implementations, the scanner can inspect from a 6-inch diameter outside of a pipe to flat surface and from flat surface to a 100-inch diameter inside of a pipe for a longitudinal inspection.

DETAILED DESCRIPTION

Figure 1:
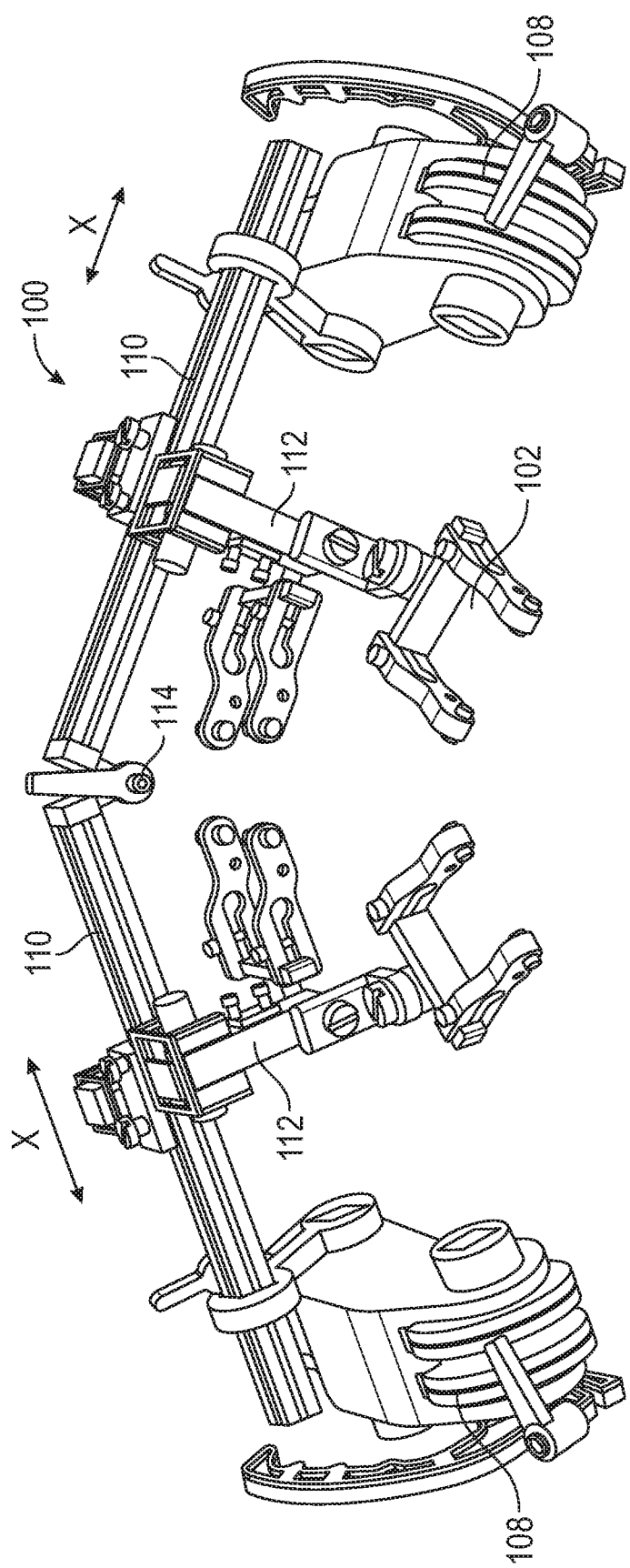
FIGS. 1 and 2 illustrate a scanning device.
Figure 2:
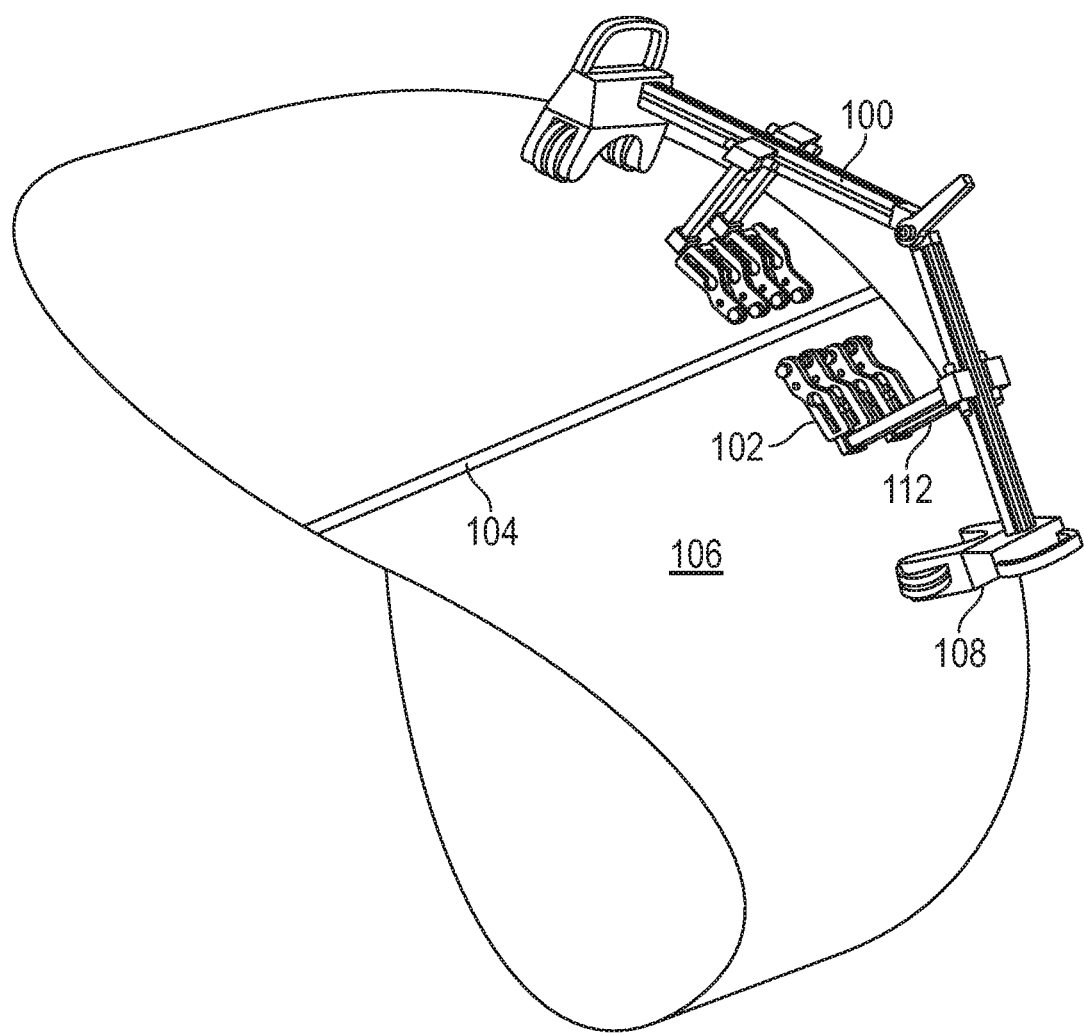

As mentioned above, various techniques can be used to perform inspection of welds, such as using an acoustic inspection techniques comprising ultrasonic testing. Making reference to FIGS. 1 and 2, when inspecting axial welds, a testing apparatus 100 uses sensor forks 102 to hold sensors (not shown) in to perform ultrasonic testing of a weld 104 on a pipe 106. The testing apparatus 100 includes wheels 108 mounted on frames 110. In addition, the sensor forks 102 mount on the frames 110 with arms 112.

When the testing apparatus 100 is used to test the weld 104, the testing apparatus 100 requires multiple adjustments to ensure that the sensor forks 102 can properly test the weld 104 during ultrasonic testing. For example, the arms 112 must be pivoted about a coupling 114 in either a clockwise or counterclockwise direction. Furthermore, the sensor forks 102 must be adjusted along the frame 110 in the X-direction. The wheels 108 also must be adjusted along the frame in the X-direction. All of these adjustments are made for pipes having varying diameters. In addition, should any of the adjustments to the arms 112 about the coupling 114, the phased array sensors along the frame 110, or the wheels 108 along the frame 110 be incorrectly made, the sensors will not accurately test the weld 104.

In an example where a repair is made that necessitated making a circumferential weld is made to a pipe, the testing apparatus 100 may be configured to test a circumferential weld. Similar to the adjustments made to the testing apparatus 100 during axial testing, the sensor forks 102 and the wheels 108 must be adjusted along the frame 110 in the X-direction. Furthermore, the arms 112 must be pivoted about the coupling 114 in either a clockwise or counterclockwise direction such that the wheels 108 are in the same plane. As may be appreciated, making all of these adjustments is time consuming and, as noted above, introduces the possibility of making incorrect adjustments and resulting in weld testing that is incorrect.

Implementations of the present disclosure address the problems noted above by providing an ultrasound scanning device having wheels that are in a specified (e.g., fixed) position along with a fixed frame. The wheels and the frame allow the ultrasound scanning device to move along a surface, such as a surface of a pipe, while the ultrasound scanning device scans a joint on or within the pipe, e.g., a weld, in a longitudinal direction of an article being inspected, such as a pipe. In an implementation, the wheels may have a fixed dome configuration. A position of the wheels and the frame are fixed such that as few as a single adjustment may be used to adapt between scanning along a longitudinal direction of an article and, in instances of circular articles, a circumference of the article. In some embodiments, no adjustments are required to adapt the scanning device between scanning along a longitudinal direction of an article and, in instances of circular articles, a circumference of the article, such as when the article has a diameter of at least sixteen inches. When a longitudinal portion of a pipe is being inspected, such as a weld that runs a length of the pipe, knobs can be adjusted in an upward or downward direction depending on the diameter of the pipe such that sensors coupled with sensor arms are positioned on to the pipe. Specifically, the sensor arms can travel along a channel when the knobs are adjusted. When the sensor arms are adjusted, a probe center defined by the phased array probes can be adjusted. In an implementation, the ultrasound scanning device can scan pipes having a diameter greater than about 6 inches. In a further implementation, the ultrasound scanning device can scan pipes having a 6 inch minimum diameter for longitudinal inspection and a 4 inch minimum diameter for circumferential inspection. In some implementations, the scanner can inspect from a 6 inch diameter outside of a pipe to flat surface and from flat surface to a 100 inch diameter inside of a pipe for a longitudinal inspection.

Figure 3:
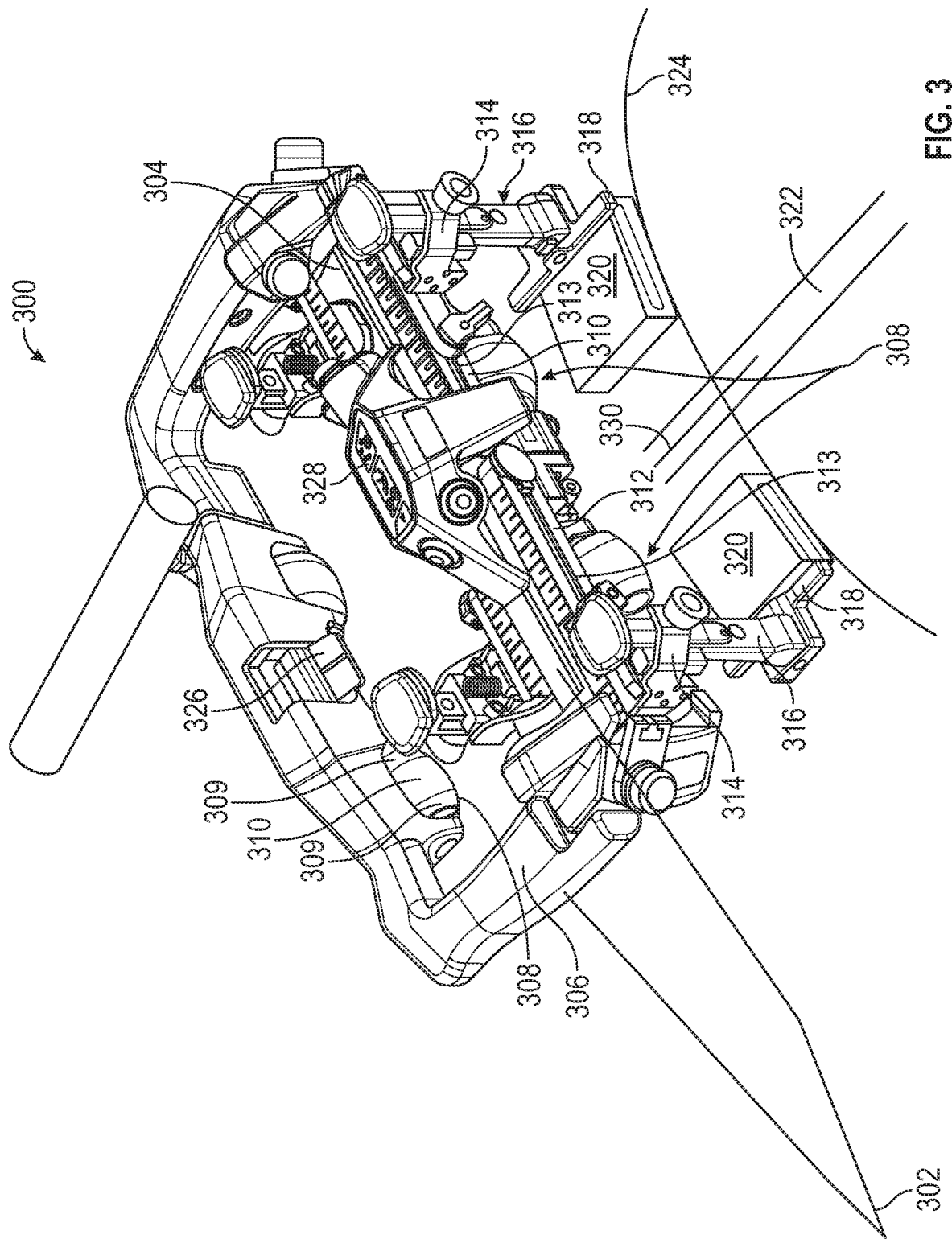
FIG. 3 is a view of an ultrasound scanning device that includes a frame, wheels, knobs, and phased array arms, where the ultrasound scanning device is configured to perform a longitudinal inspection, in accordance with the present disclosure.

Making reference to FIG. 3, an ultrasound scanning device 300 is shown that includes a frame 302 having a first frame portion 304 and a second frame portion 306. In accordance with implementations of the present disclosure, the ultrasound scanning device 300 can be any type of device that scans an article, such as a pipe, a metal sheet, a tank, or the like. These types of devices can include ultrasonic scanners, optical scanners, x-ray scanners, and the like. The frame 302 along with the first frame portion 304 and the second frame portion 306 may be formed with a 3D printing procedure where the frame 302 is formed from nylon. However, the frame 302 can be formed using other techniques, such as casting, injection molding, or any other suitable technique. The frame 302 can also be formed from any type of metal alloy, a thermoplastic, or any other type of rigid material.

Each of the first frame portion 304 and the second frame portion 306 can include wheels 308 that are magnetized and have a dome configuration. The ultrasound scanning device 300 can be used with articles formed of metal, such as a pipe, a metal sheet, a tank, or the like. Since the wheels 308 can be magnetized, the wheels 308 can assist with coupling the ultrasound scanning device 300 to an article 324 during use of the ultrasound scanning device 300. In an implementation, the wheels 308 can include a magnetized portion 309 made from any type of magnetizing material that facilitates coupling of the ultrasound scanning device 300 with the article 324 during scanning of the article 324. Examples of magnetizing material that can be used include molybdenum, cobalt, or the like. In order to facilitate contact of the magnetized portion 309 with the article 324 during use of the ultrasound scanning device 300, the wheels 308 can include a wheel contact 310 that physically contacts with the article 324. In an implementation, the wheel contact 310 can wrap around the magnetized portion 309 and may be formed of plastic, a metal alloy, rubber, or any type of flexible or inflexible material that allows a magnetic coupling between the wheels 308 and the article 324. Moreover, in an implementation, the wheels 308 are fixed such that when the ultrasound scanning device 300 is adjusted, the wheels 308 may remain in the same position such that the wheels 308 do not require adjustment. In an alternative implementation, the wheels 308 can be adjustable.

Figure 4A:
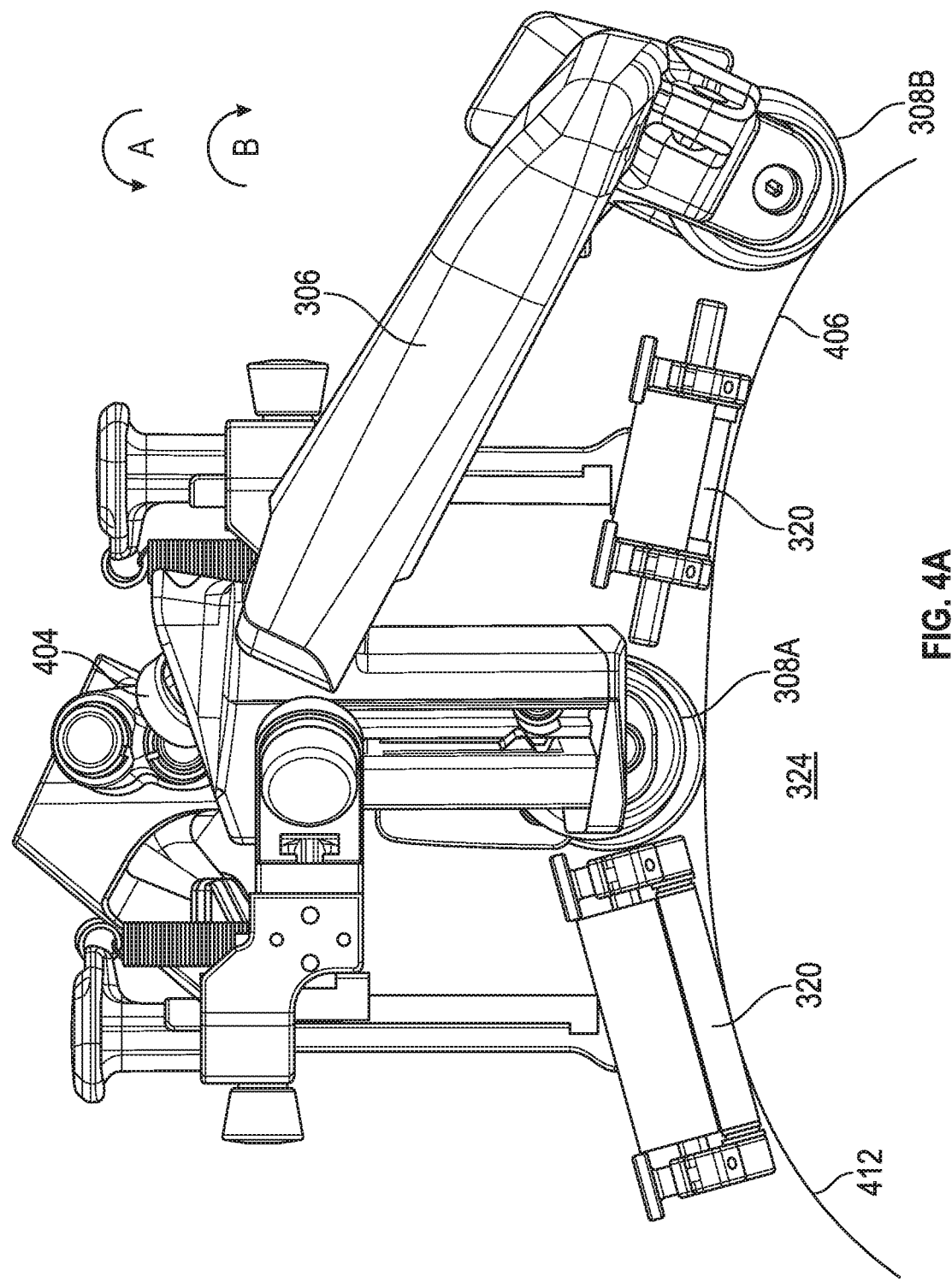
FIG. 4A illustrates an ultrasonic scanning device of FIG. 3 being configured to scan a circumference of an article, in accordance with the present disclosure.
Figure 4B:
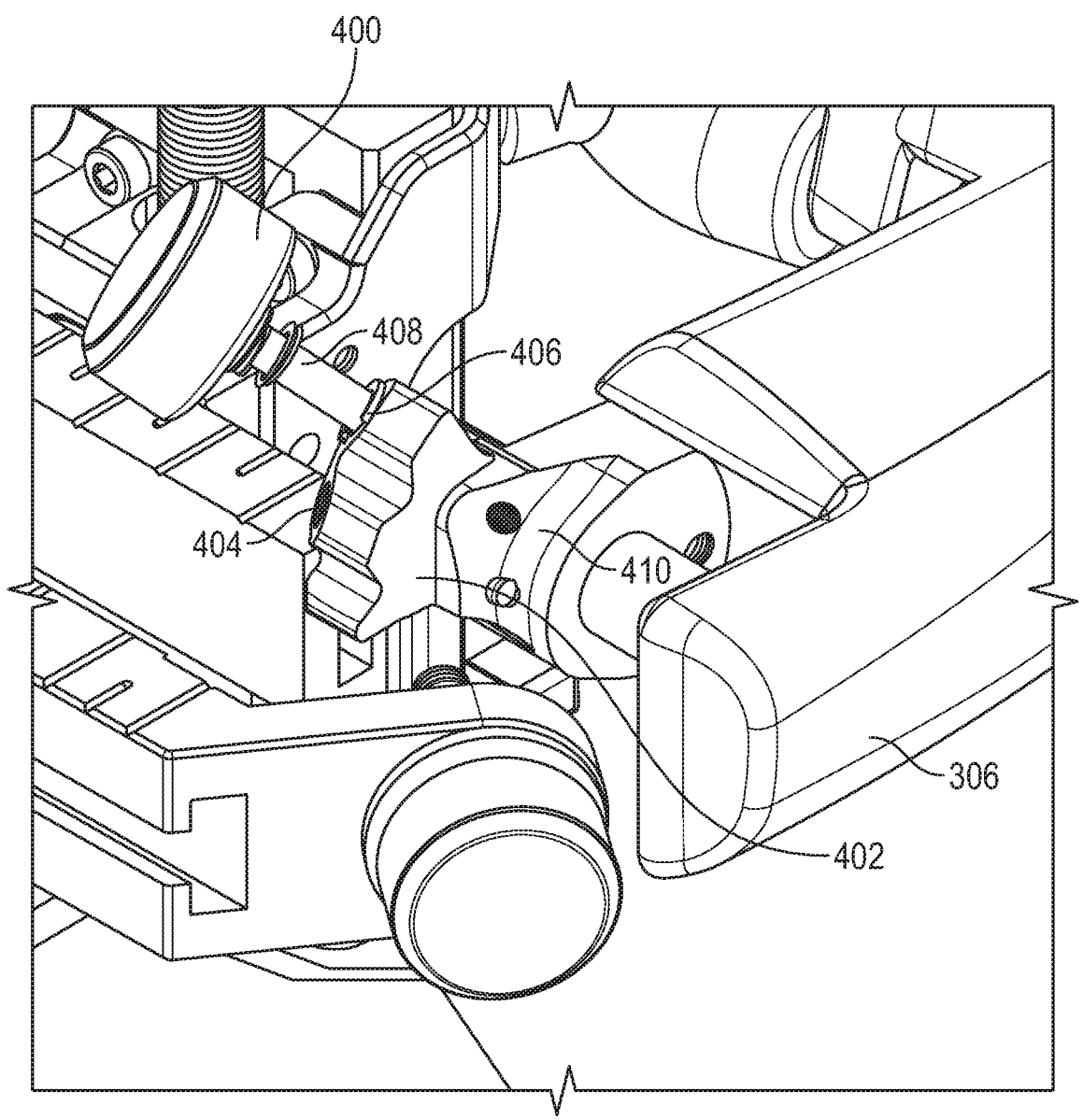
FIG. 4B shows a frame adjustment assembly that can be used to adjust the ultrasonic scanning device between the configuration shown with reference to FIG. 3 and with reference to FIG. 4A, in accordance with the present disclosure.
Figure 4C:
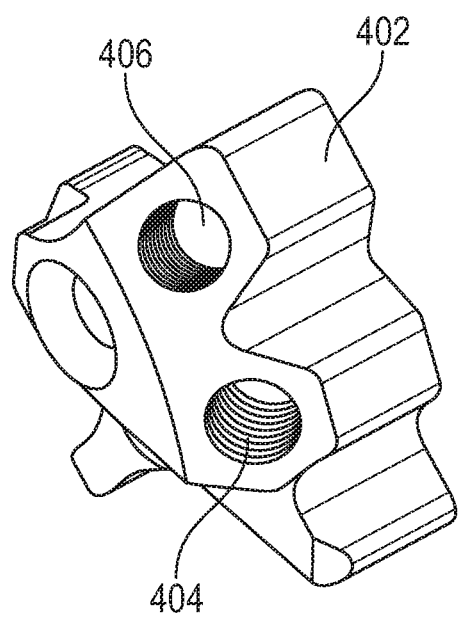
FIG. 4C shows a lock of the frame adjustment assembly FIG. 4B, in accordance with the present disclosure.

The first frame portion 304 couples with the second frame portion 306 such that the first frame portion 304 and the second frame portion 306 pivot with respect to each other via a frame adjustment assembly to allow the ultrasound scanning device 300 to have the configuration shown with reference to FIG. 4A. The ultrasound scanning device 300 has a frame adjustment assembly that includes a knob 400 and a lock 402, as may be seen with regards to FIG. 4B. In an implementation, the lock 402 can have lock positioners 404 and 406 as shown with reference to FIGS. 4B and 4C, which engage with a shaft 408 of the knob 400. In an implementation, the knob shaft 408 can be threaded and each of the lock positioners 404 and 406 can have complementary threads such that the knob shaft 408 can threadingly engage with each of the lock positioners 404 and 406. While threading engagement is discussed, other suitable methods can be used to engage the knob shaft 408 with each of the lock positioners 404 and 406, such as a press fit between the knob shaft 408 and each of the lock positioners 404 and 406, a tension spring, or the like. In an implementation, the lock 402 is disposed on an arm 410 where the arm 410 can position the lock 402 within the ultrasound scanning device 300.

In an implementation, the frame adjustment assembly can be used to adjust the ultrasound scanning device 300 between the configuration shown with reference to FIG. 3 and with reference to FIG. 4A. More specifically, in order to orient the ultrasound scanning device 300 into the configuration of FIG. 3, the knob shaft 408 can be disposed in the lock positioner 406. In order to place the ultrasound scanning device 300 into the configuration shown with reference to FIG. 4A, the knob shaft 408 can be placed into the lock positioner 404. Thus, the frame adjustment assembly allows the ultrasound scanning device 300 to be in multiple configurations depending on how the article 324 is being scanned. For example, if the article 324 is being scanned in a longitudinal direction, the knob shaft 408 is placed into the lock positioner 406 as shown with reference to FIG. 4B in order to place the ultrasound scanning device 300 into the configuration of FIG. 3. In accordance with an implementation, if a circumference of the article 324 is being inspected, the knob shaft 408 is removed from the lock positioner 406 and placed into the lock positioner 404. As noted above, when the knob shaft 408 is in the lock positioner 404, the ultrasound scanning device 300 has the configuration shown with reference to FIG. 4A. While two lock positioners 404 and 406 are shown, the lock 402 may include any number of lock positioners such that the ultrasonic scanning device 300 may be adjusted into any number of positions with the lock 402. In some implementations, where the article 324 is a pipe, the ultrasound scanning device 300 can scan pipes having a diameter of at least 4 inches to flat. In some implementations the ultrasound scanning device 300 can inspect pipes having a diameter of at least 10 inches to flat.

Returning attention to FIG. 3, the ultrasound scanning device 300 can include a rail 312 movably disposed on the first frame portion 304. Throughout this Specification, reference is made to both a rail 312 and rails 312. It should be noted that the terms rail 312 and rails 312 are used interchangeably herein. In an implementation, the rail 312 can include a channel 313 where a rail arm 314 is disposed within the channel 313 and can move along the channel 313. The rail arm 314 couples with a sensor arm 316 and the sensor arm 316 couples with a sensor fork 318. The sensor fork 318 holds a sensor 320 which can be oriented to examine a weld 322 on or in the article 324, such as a pipe in an axial direction. Throughout this Specification, reference is made to both a sensor arm 316 and sensor arms 316. It should be noted that the terms sensor arm 316 and sensor arms 316 are used interchangeably herein. Furthermore, throughout this Specification, reference is made to both a sensor fork 318 and sensor forks 318. It should be noted that the terms sensor fork 318 and sensor forks 318 are used interchangeably herein. In an implementation, the sensor arm 316, the sensor fork 318, and the sensor 320 form a sensor assembly. It should be noted that while the article 324 is described as a pipe, the article 324 can include a flat panel, such as a metal sheet, a tank, or the like. In addition, while the present disclosure describes the sensor 320 examining a weld, such as the weld 322, the sensor 320 can examine any type of joint, bond, seam, juncture, or any point where two similar or disparate surfaces meet or join.

Figure 5A:
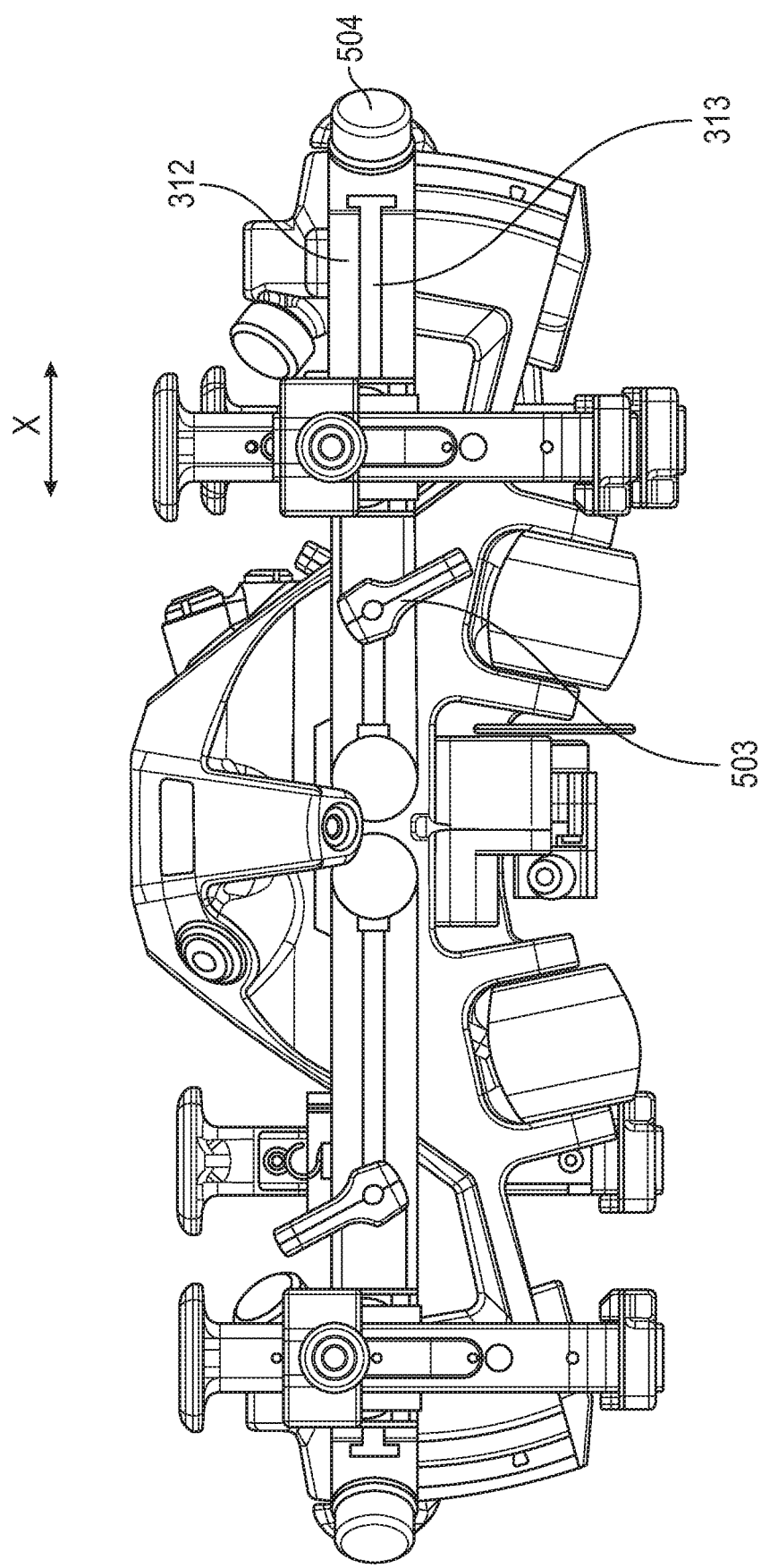
FIGS. 5A-5C illustrate a channel of the ultrasonic scanning device shown with reference to FIG. 3, where the channel defines a groove within which a tab that extends from a rail arm of the ultrasonic scanning device of FIG. 3 resides, in accordance with the present disclosure.
Figure 5B:
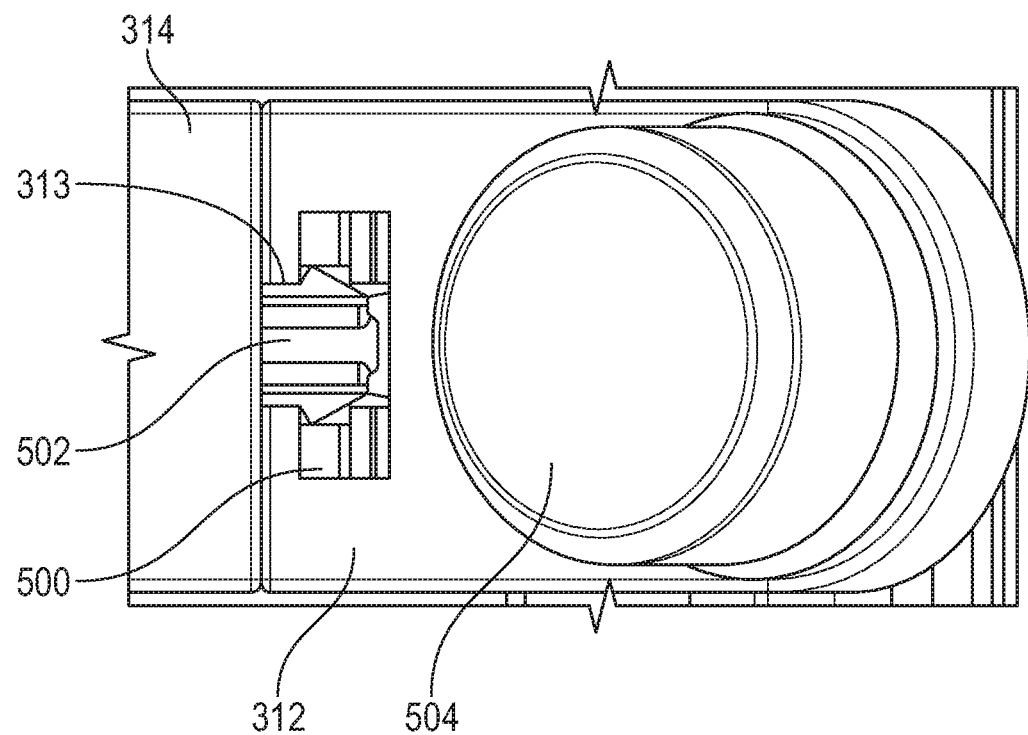
Figure 5C:
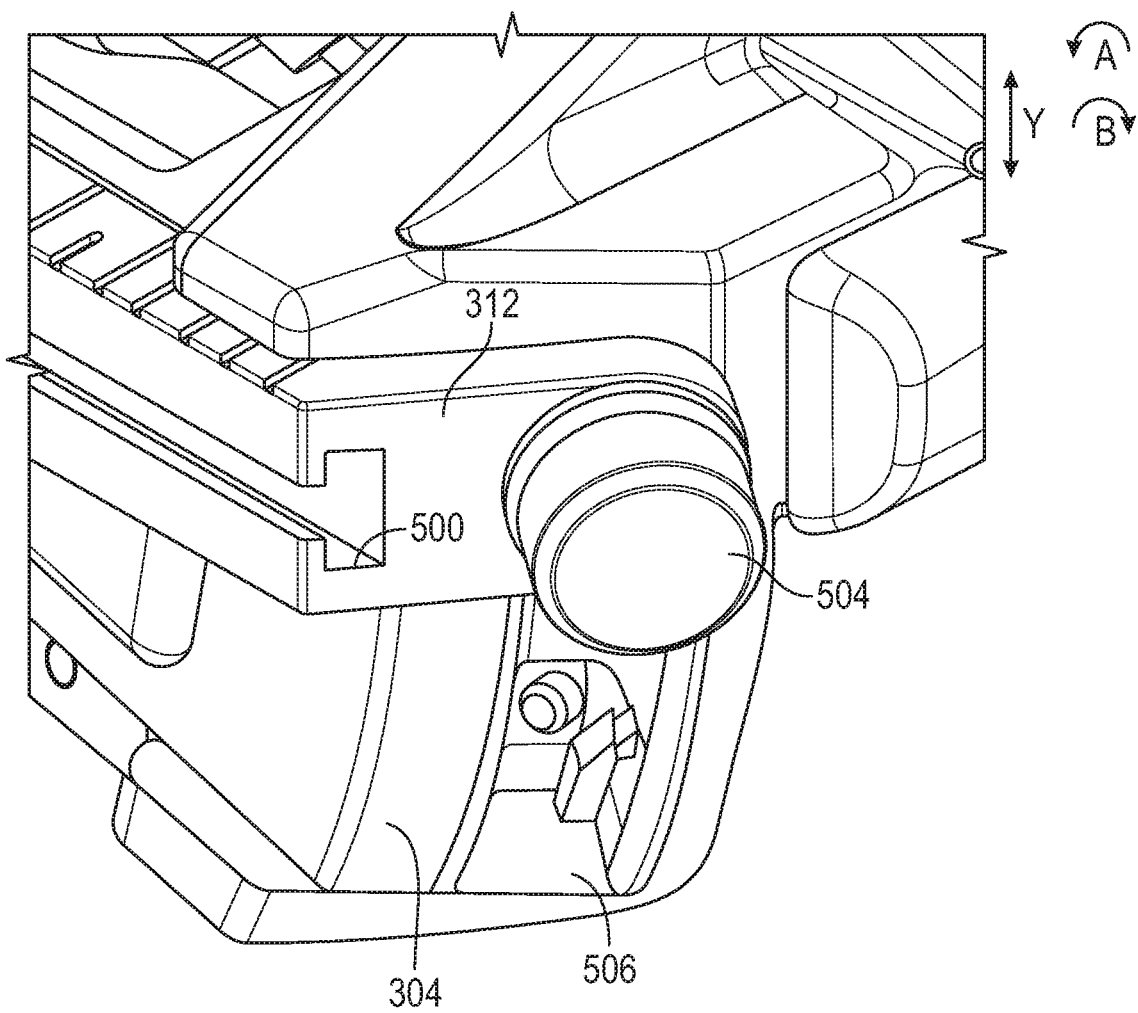

Making reference to FIGS. 5A-5C, the channel 313 defines a groove 500 within which a tab 502 that extends from the rail arm 314 resides. In an implementation, the tab 502 can slide within the groove 500 such that a position of the rail arm 314 can be adjusted during use of the ultrasound scanning device 300. In particular, a lock 503 can be engaged, which, when disengaged, allows the tab 502 to move within the groove 500 along the direction X. Moreover, when the lock 503 is engaged, the tab 502 can be locked within the groove 500.

The ultrasound scanning device 300 includes a knob 504 slidingly disposed within a guide 506. In an implementation, the knob 504 can be rotated along a direction B in order to tighten the knob against the first frame portion 304. In an implementation, the knob 504 can be rotated along a direction A in order to loosen the knob from the first frame portion 304. When the knob 504 is loosened from the first frame portion 304, the knob 504 can slide within the guide 506 along a direction Y. For example, the knob 504 can be moved downwardly along the direction Y. In an implementation, the knob 504 can be used to adjust sensors of the ultrasound scanning device 300 based on a diameter of the article 324 such that the ultrasound scanning device 300 has a configuration shown with reference to FIGS. 5D and 5E.

Figure 5D:
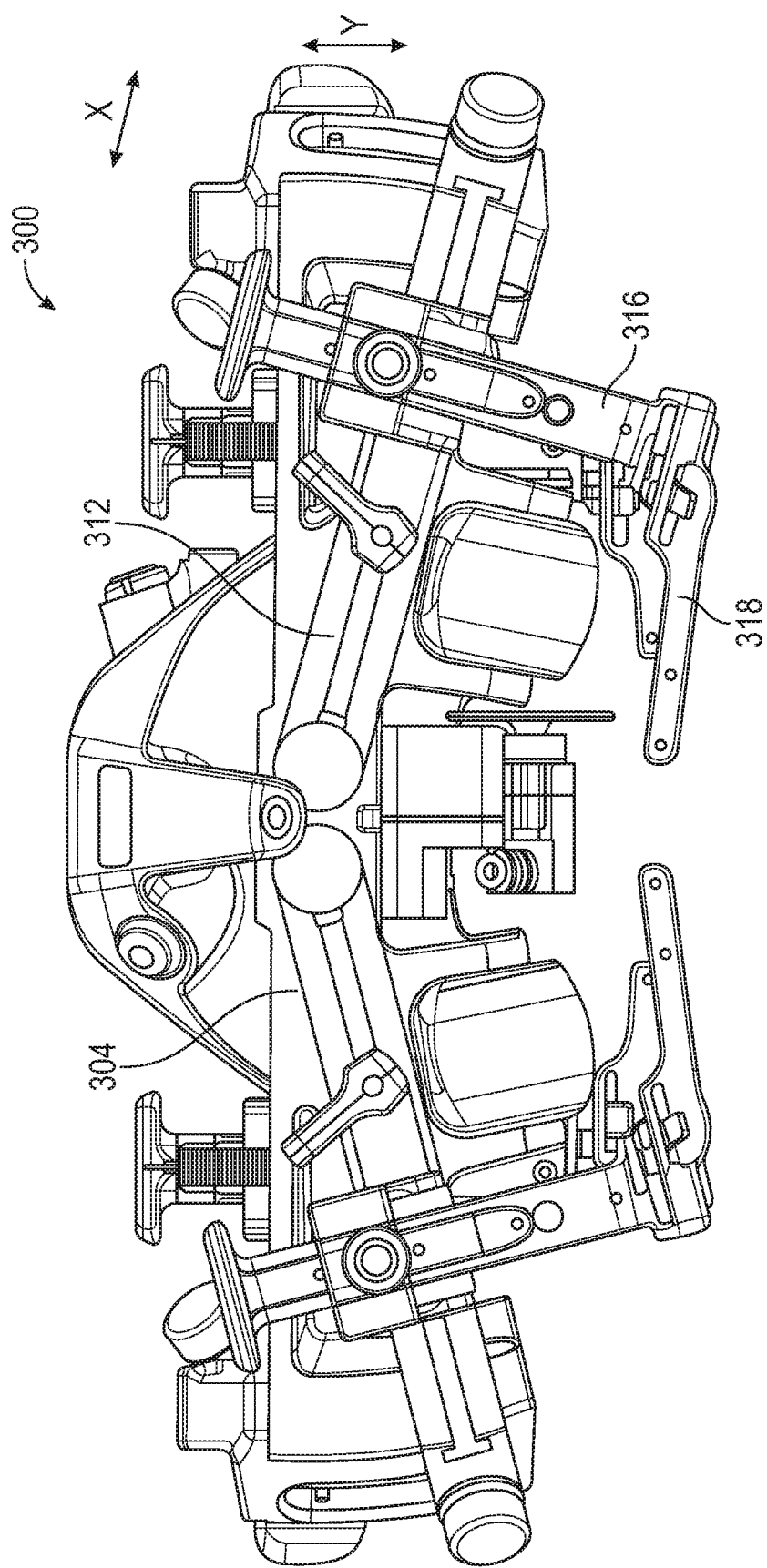
FIGS. 5D and 5E illustrate an alternative configuration of the ultrasonic scanning device shown with regards to FIG. 3, in accordance with the present disclosure.
Figure 5E:
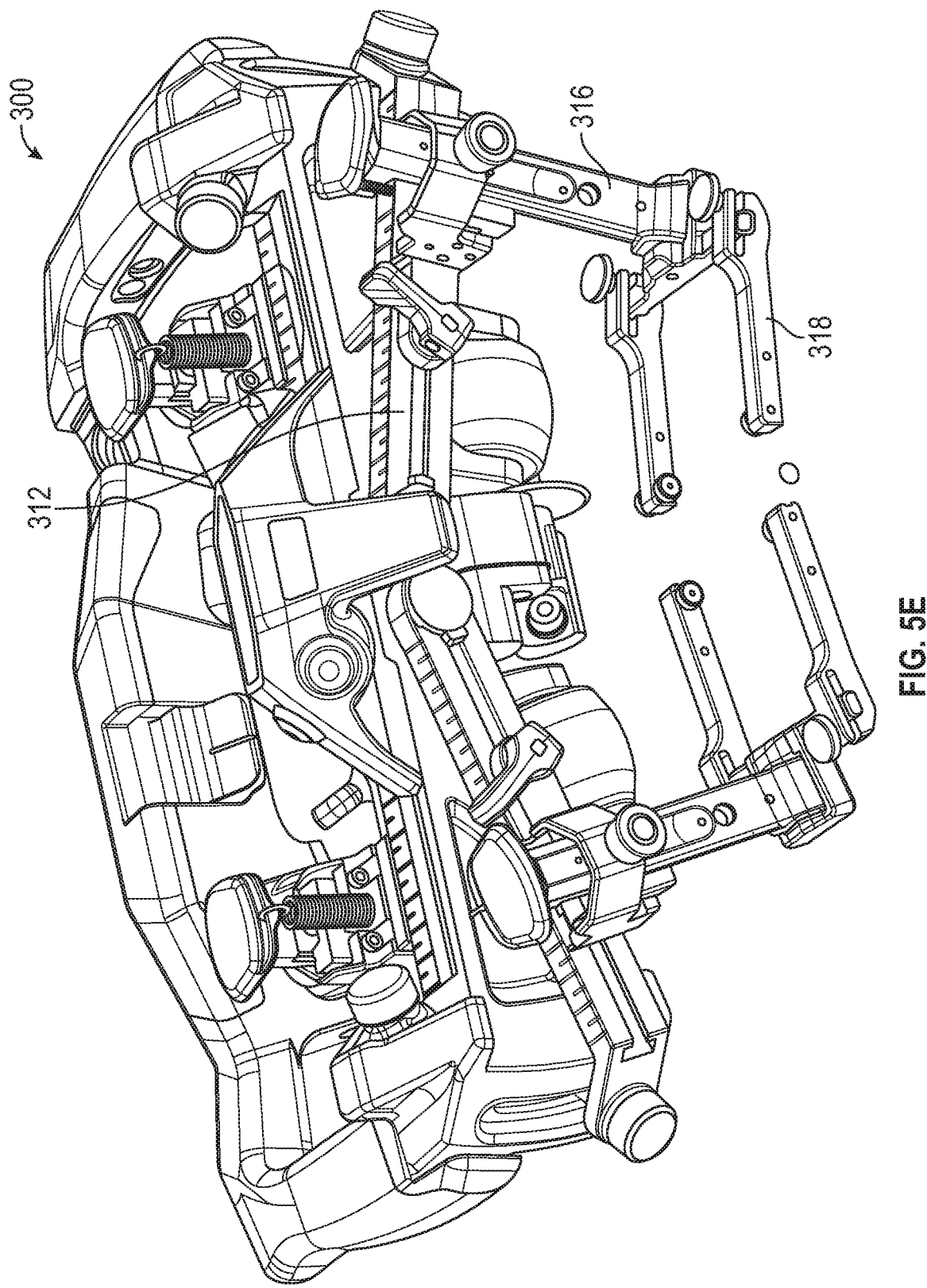

As may be seen with reference to FIG. 5D, the rail 312 can move relative to the first frame portion 304 such that the rail 312 moves in a downward position along a direction Y. In addition, as the rail 312 moves along the downward direction Y, the sensor arm 316 and the sensor fork 318 can move into the position shown with reference to FIGS. 5D and 5E. As may be seen with reference to FIGS. 5D and 5E, both of the rails 312 along with both of the sensor arms 316 and the sensor forks 318 are moved into the configuration shown with reference to FIGS. 5D and 5E. In alternative embodiments, only one of the rails 312 along with only one of the sensor arms 316 and the sensor forks 318 move with the rail 312 such that one of the rails 312, one of the sensor arms 316, and one of the sensor forks 318 has the configuration shown with respect to FIGS. 5D and 5E while the other of the rails 312, the sensor arms 316, and the sensor forks 318 has the configuration shown with respect to FIG. 3.

Figure 6A:
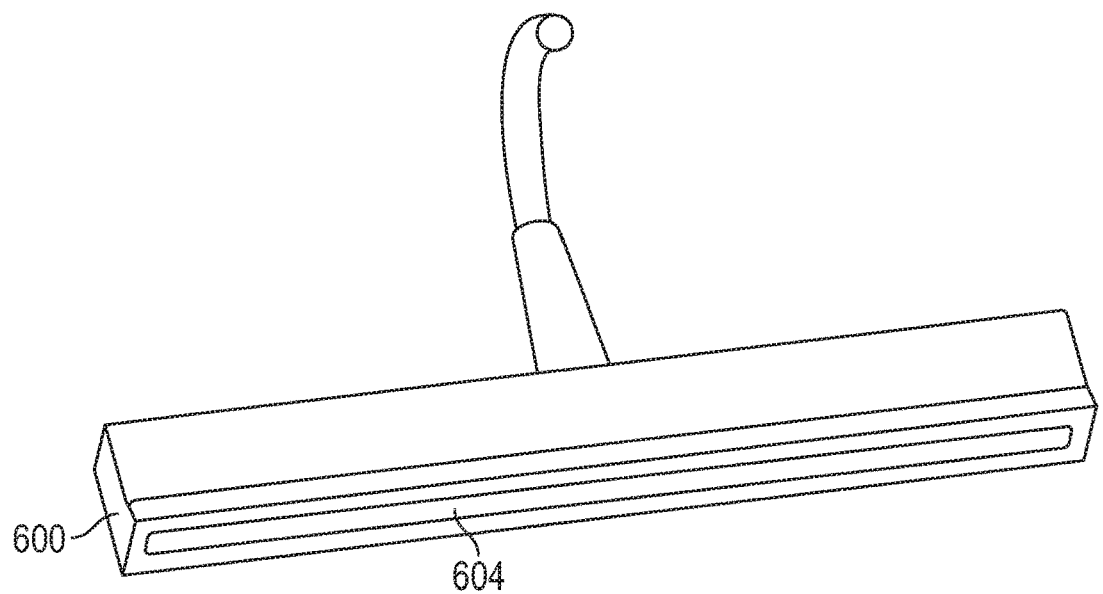
FIG. 6A shows a phased array sensor that can be used with the ultrasonic scanning device of FIG. 3, in accordance with the present disclosure.
Figure 6B:
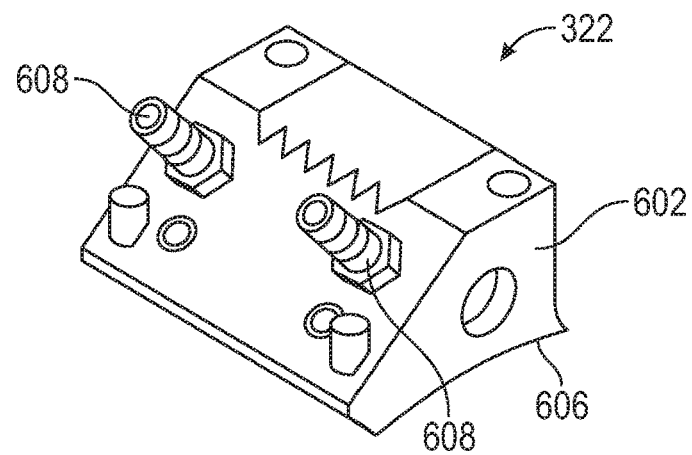
FIGS. 6B and 6C illustrate sensor wedges that can be used with the phased array sensor shown with regards to FIG. 6A, in accordance with the present disclosure.
Figure 6C:
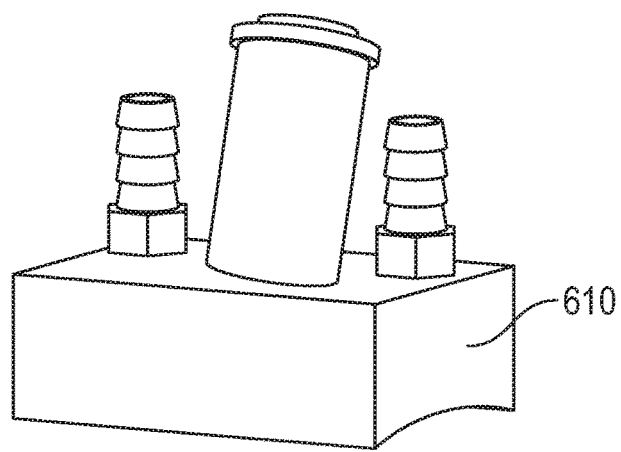

In an implementation, the sensor 320 can include a phased array sensor 600 disposed within a sensor wedge 602, as shown with regards to FIGS. 6A-6C. In an implementation, the phased array sensor 600 can use phased array ultrasonic testing that can emit a beam in a fixed direction. In an implementation, ultrasonic testing uses mechanical vibrations similar to sound waves but having a higher frequency. In an implementation, a beam of ultrasonic energy is directed into the article 324 and travels through the article 324 without any significant loss. However, if the weld 322 has a discontinuity, defect, or any other type of abnormality, the discontinuity will intercept and reflect back the beam of ultrasonic energy. Ultrasonic testing can implement transducers that can be excited by a high-frequency voltage, which causes vibration of a crystal in the transducer such that the crystal can be the source of the ultrasonic mechanical vibration. These vibrations are transmitted into the test piece through a couplant as ultrasonic waves. Examples of couplant can include water, gel, or oil. When a pulse of the ultrasonic waves strikes a discontinuity in the weld 322, the pulse is reflected back such that energy returns to the transducer. The data from the reflected energy can be used to determine the presence of a discontinuity in the weld 322. It should be noted that while the sensor 320 is described above as including the phased array sensor 600 within the sensor wedge 602, any type of sensing device may be used. For example, an Olympus A32 Probe available from Olympus Corporation of the Americas headquartered in Center Valley, Pa. from may be used for the sensor 320.

An advantage of ultrasonic testing is the ability to determine the exact position of a discontinuity in the weld 322. In an implementation, the phased array sensor 600 can be a phased array probe that includes any number of pulsing elements 604, such as 64 pulsing elements 604 or 128 pulsing elements 604, that is capable of being used with refracted shear-wave ultrasonic inspections. An example of sensors that can be used for the phased array sensor 600 include an Olympus A31 Probe available from Olympus Corporation of the Americas headquartered in Center Valley, Pa.

The sensor wedge 602 can include a curved portion 606 that abuts a surface of the pipe 324. The sensor wedge 602 can provide a couplant that the phased array sensor 600 of the sensor 320 can use during scanning of the pipe 324. Moreover, the curved portion 606 may be customized based on the dimensions of the article being inspected. As an example, the diameter for the pipe 324 can be a minimum of six inches and the curved portion 606 of the sensor wedge 602 can be configured to accommodate a diameter of six inches. Moreover, in some implementations, the sensor wedge 602 can include couplant ports 608, which allow for the passage of couplant through the sensor wedge 602 when the ultrasound scanning device 300 is used during ultrasonic testing. An example of wedges that can be used for the sensor wedge 602 include sensor wedges available from Olympus Corporation of the Americas headquartered in Center Valley, Pa.

In a further implementation, the sensor 320 may also include a time-of-flight diffraction transducer (TOFD) 610, as shown with reference to FIG. 6C. In this embodiment, the TOFD 610 may be used with a sensor wedge 612 during operation of the ultrasound scanning device 300. An example of TOFDs that can be used for the TOFD 610 include TOFDs available from Olympus Corporation of the Americas headquartered in Center Valley, Pa.

Figure 7:
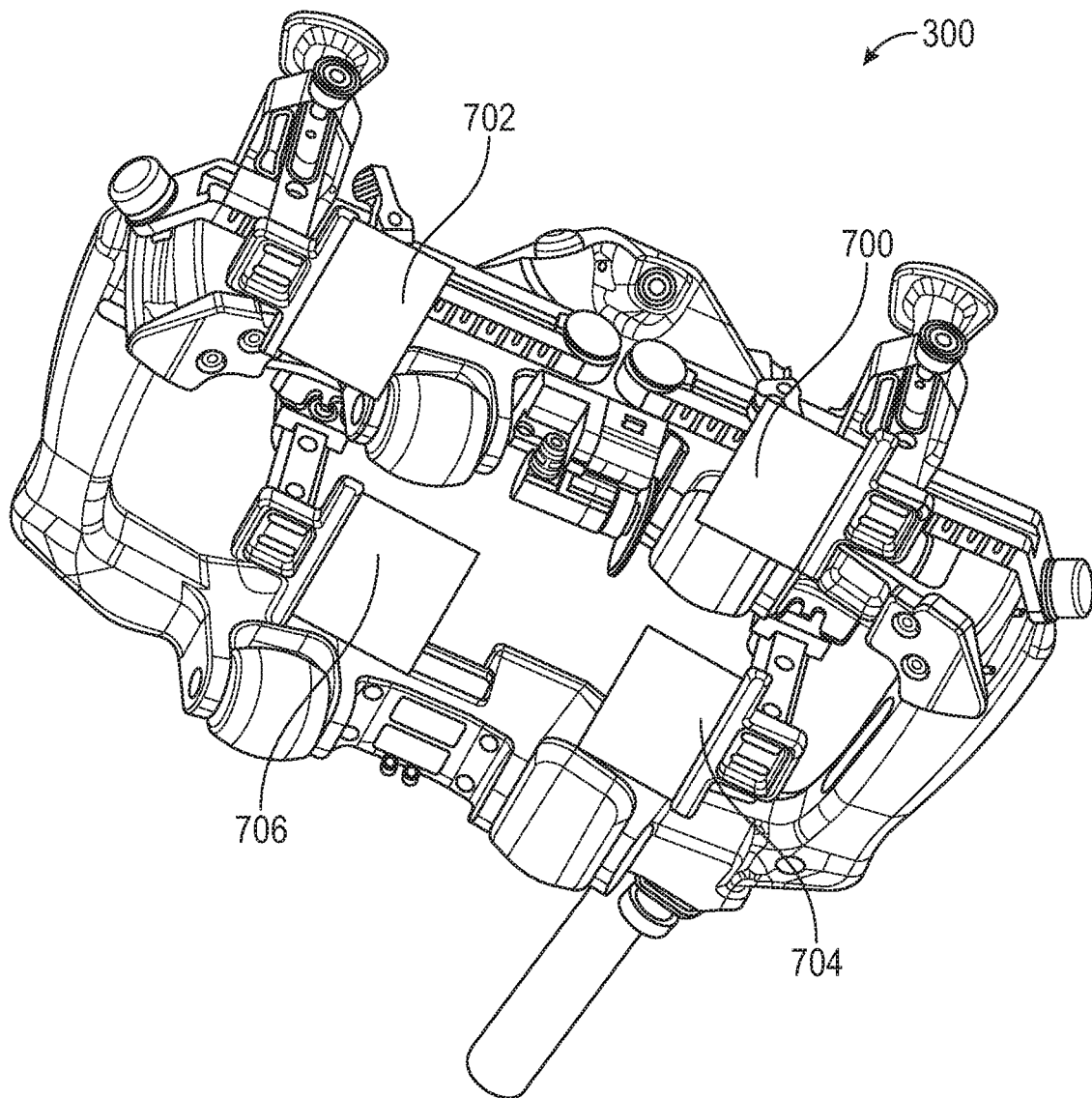
FIG. 7 shows a bottom view of the ultrasound scanning device shown with reference to FIG. 3, in accordance with the present disclosure.

In some implementations, the ultrasound scanning device 300 can include both the phased array sensor 600 and the TOFD 610 as the sensor 320. In particular, in some implementations, the ultrasound scanning device 300 may include any number of sensors 320 where some of the sensors can be the phased array sensor 600 while some of the sensors 320 can be the TOFD 610. To further illustrate, making reference to FIG. 7, a bottom view of the ultrasound scanning device 300 shown with reference to FIG. 3 is illustrated. As may be seen with reference to FIG. 7, the ultrasound scanning device 300 can include sensors 700-706. In this implementation, the sensors 700-706 can be similar to the sensor 320. More specifically, each of the sensors 700-706 can have the same functionality of the sensor 302. Thus, in an implementation, each of the sensors 700-706 can be the phased array sensor 600 or the TOFD 610. Moreover, in some implementations, the sensors 700 and 702 can each be the phased array sensor 600 while the sensors 704 and 706 can each be the TOFD 610. Alternatively, the sensors 700 and 702 can each be the TOFD 610 while the sensors 704 and 706 can each be the phased array sensor 600. As discussed above, in implementations where the article 324 is a pipe, the ultrasound scanning device 300 can scan pipes having a diameter of at least 4 inches to flat. In these implementations, the ultrasound scanning device 300 is capable of scanning pipes having a diameter of at least 4 inches to flat when the ultrasound scanning device 300 includes two sensors 320. In implementations where the ultrasound scanning device 10 includes the sensors 700-706, the ultrasound scanning device 300 can inspect pipes having a diameter of at least 10 inches to flat.

Figure 8A:
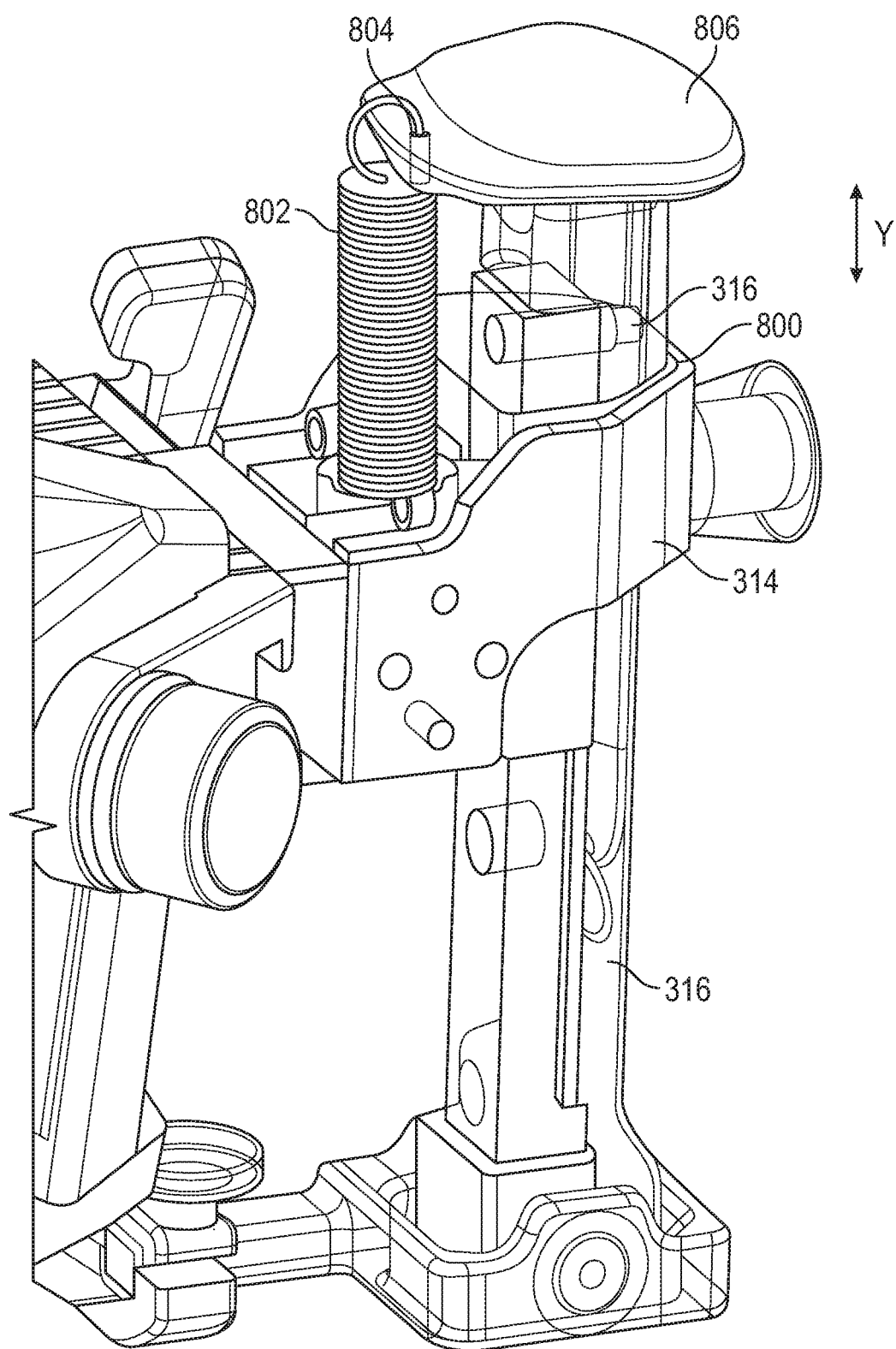
FIGS. 8A and 8B illustrate an assembly that can be used to bias a sensor of the ultrasound scanning device of FIG. 3 against an article, in accordance with the present disclosure.
Figure 8B:
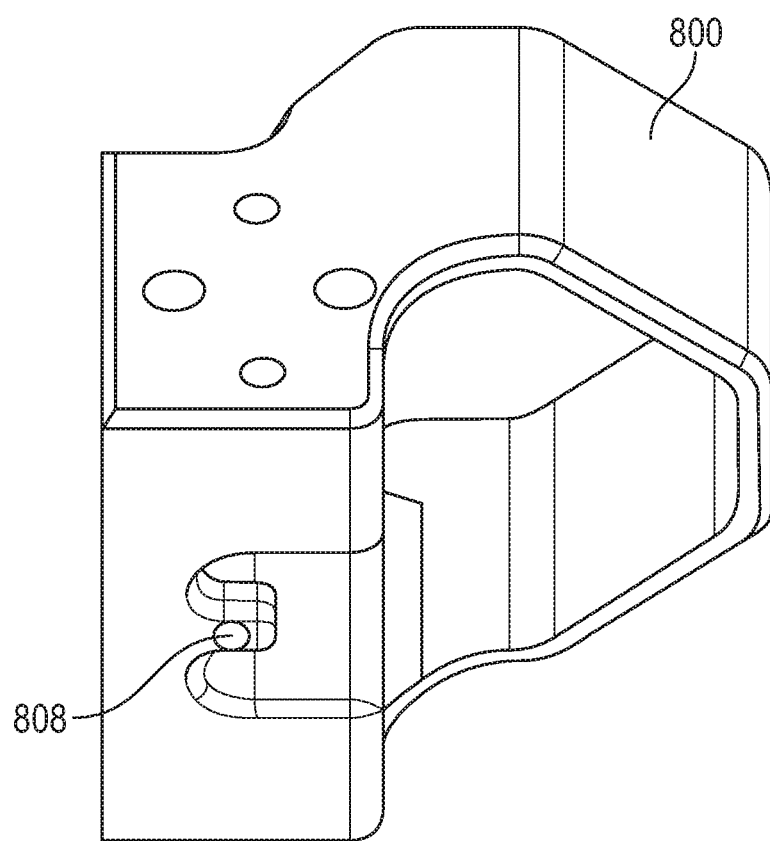

As noted above, the sensor fork 318 can hold the sensor 320 where the sensor fork 318 couples with the sensor arm 316. Moreover, as previously noted, the sensor arm 316 can couple with the rail arm 314. In some implementations, the sensor arm 316 can be slidingly disposed within the rail arm 314 such that the sensor arm 316 can move relative to the rail arm 314, as shown with reference to FIG. 8A. In particular, the sensor arm 316 can be disposed within a frame 800 of the rail arm 314. In an implementation, the sensor arm 316 can move along a direction Y during operation of the ultrasound scanning device 300. The ultrasound scanning device 300 includes a tension spring 802 that can downwardly bias the sensor arm 316 along the direction Y. More specifically, the tension spring 802 can couple to the sensor arm 316 at a hole 804 at a top end 806 of the sensor arm 316. Moreover, the tension spring 802 can couple to the frame 800 at a hole 808 (FIG. 8B). Thus, via the tension spring 802, the sensor arm 316 moves the sensor fork 318 and the sensor 320 against the article 324 during operation of the ultrasound scanning device 300. It should be noted that while a tension spring is described as downwardly biasing the sensor arm 316, the sensor fork 318, and the sensor 320, any type of biasing means may be used that can downwardly bias the sensor arm 316, the sensor fork 318, and the sensor 320 along the direction Y.

As mentioned above, the knob 504 can be used to adjust the rail arm 314. For example, when the knob 504 is moved within the guide 506 along the direction Y, the rail 312 also moves in the same direction as the knob 504. As the sensors 320 are coupled with the rail arm 312 via the sensor arms 316 and the sensor forks 318, the sensors 320 are also adjusted when the knob 504 moves along the guide 506. Thus, in an implementation, the knob 504 can be upwardly or downwardly adjusted along the direction Y depending on a diameter of the article 324 when the article 324 is a pipe such that the sensors 320 can be properly positioned on the article 324 based on the diameter of the article 324 in implementations where the article 324 is a pipe. Thus, a probe center defined by the sensors 320 may be adjusted with the knobs 504.

In an implementation, the ultrasound scanning device 300 can scan pipes having a diameter greater than about 6 inches. In a further implementation, the ultrasound scanning device 300 can scan pipes having a 6 inch minimum diameter for longitudinal inspection and a 4 inch minimum diameter for circumferential inspection. In some implementations, the ultrasound scanning device 300 can inspect from a 6 inch diameter outside of a pipe to flat surface and from flat surface to 100 inch diameter inside of a pipe for a longitudinal inspection.

Figure 9A:
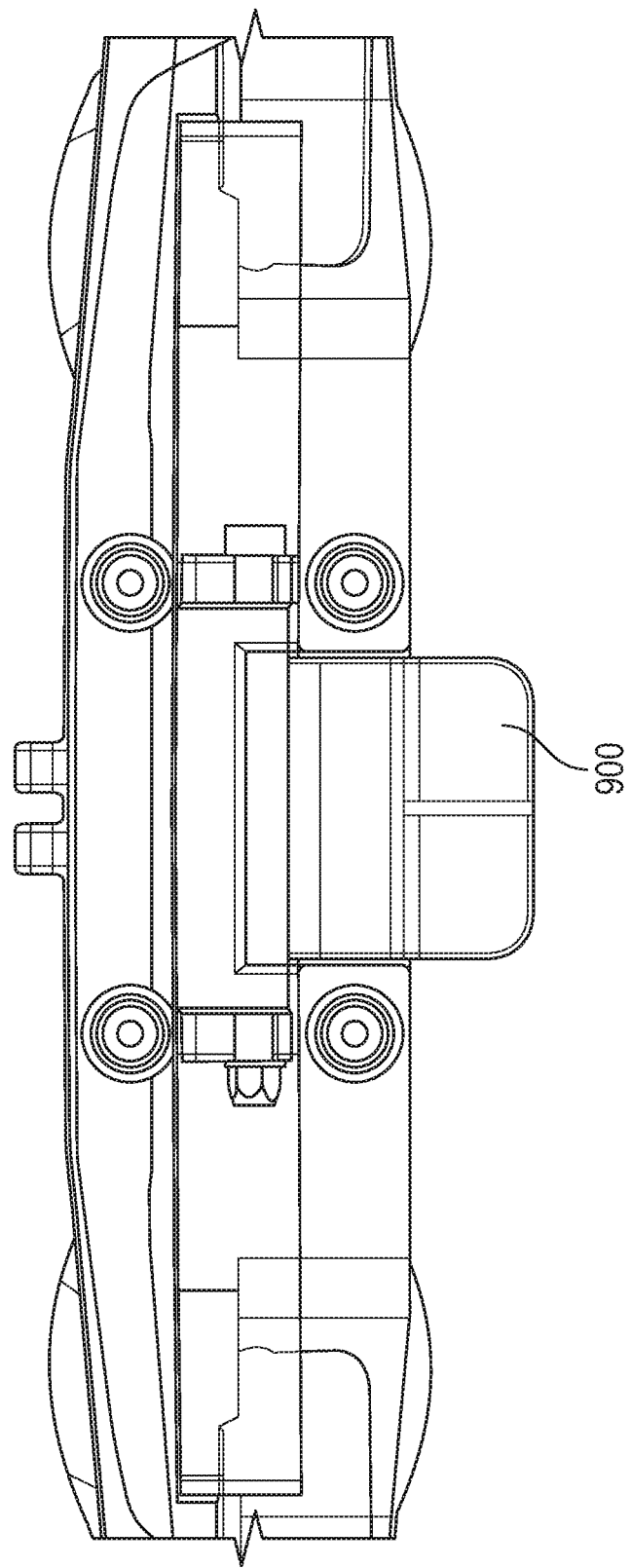
FIGS. 9A and 9B shows brake system that can be used in conjunction with the ultrasonic scanning device shown with reference to FIG. 3, in accordance with the present disclosure.
Figure 9B:
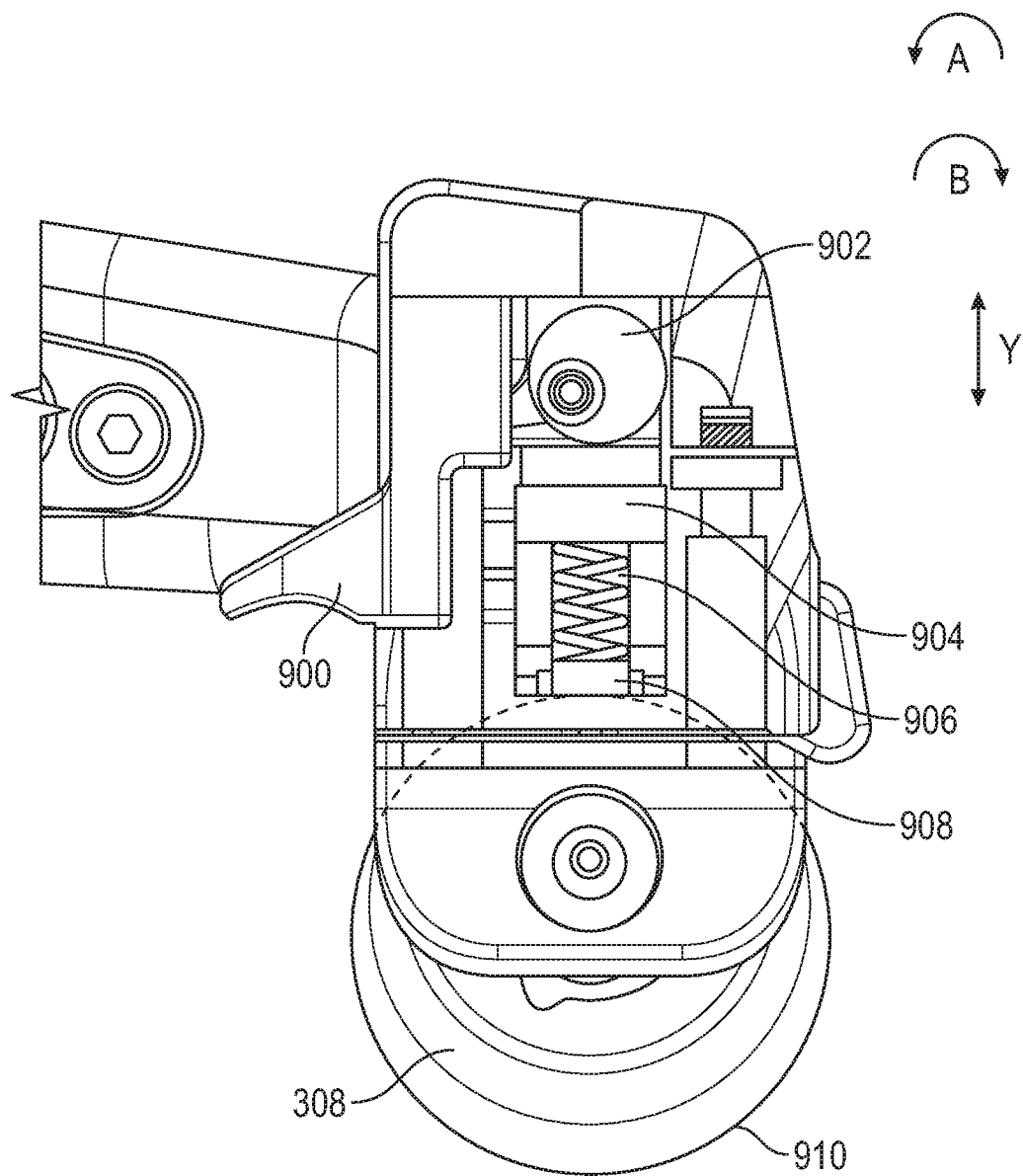

Returning attention to FIG. 3, the ultrasound scanning device 300 can also include a brake system 326 that can be used to lock the ultrasound scanning device 300. For example, turning attention to FIGS. 9A and 9B, the brake system 326 can include a brake lever 900 where the brake system 326 can include a cam 902, a boss 904, a translation means 906, and a brake 908. In an implementation, the boss 904 and the brake 908 are coupled via the translation means 906. In an implementation, the translation means 906 may be a tube or a shaft that is capable of imparting a downward force to the brake 908 when engaged by the boss 904. The cam 902 can be operatively coupled with the boss 904 through direct contact and operatively coupled with the brake 908 via the translation means 906. During operation of the brake lever 900, such as moving the brake lever upward along the direction Y, the cam 902 rotates in the direction B thereby moving the boss 904 in a downward direction along the direction Y. As the boss 904 downwardly moves along the direction Y, the boss 904 pushes the translation means 906, which moves the brake 908 in a downward direction along the direction Y. When the brake 908 moves in a downwardly direction along the direction Y, the brake 908 abuts against an outer surface 910 of the wheel 308, thereby inhibiting movement of the wheel 308. Therefore, during use of the ultrasound scanning device 300 on the article 324, the brake lever 900 along with the brake 908 can be engaged to hold the ultrasound scanning device 300 on the article 324.

Returning attention to FIG. 3, the ultrasound scanning device 300 can also include a guidance module 328 that may be used to monitor the ultrasound scanning device 300 when the ultrasound scanning device 300 is scanning the weld 322. As noted above, the ultrasound scanning device 300 may be used during ultrasonic testing. An advantage of using ultrasonic testing involves the ability to determine an exact position of a discontinuity in the weld 322. In some implementations, the ultrasound scanning device 300 should be moved in a precise manner to allow for determining a discontinuity and a position of the discontinuity. In an implementation, the guidance module 328 eases the ability to use the ultrasound scanning device 300 in a precise manner during use of the ultrasonic scanning device 300.

Figure 10A:
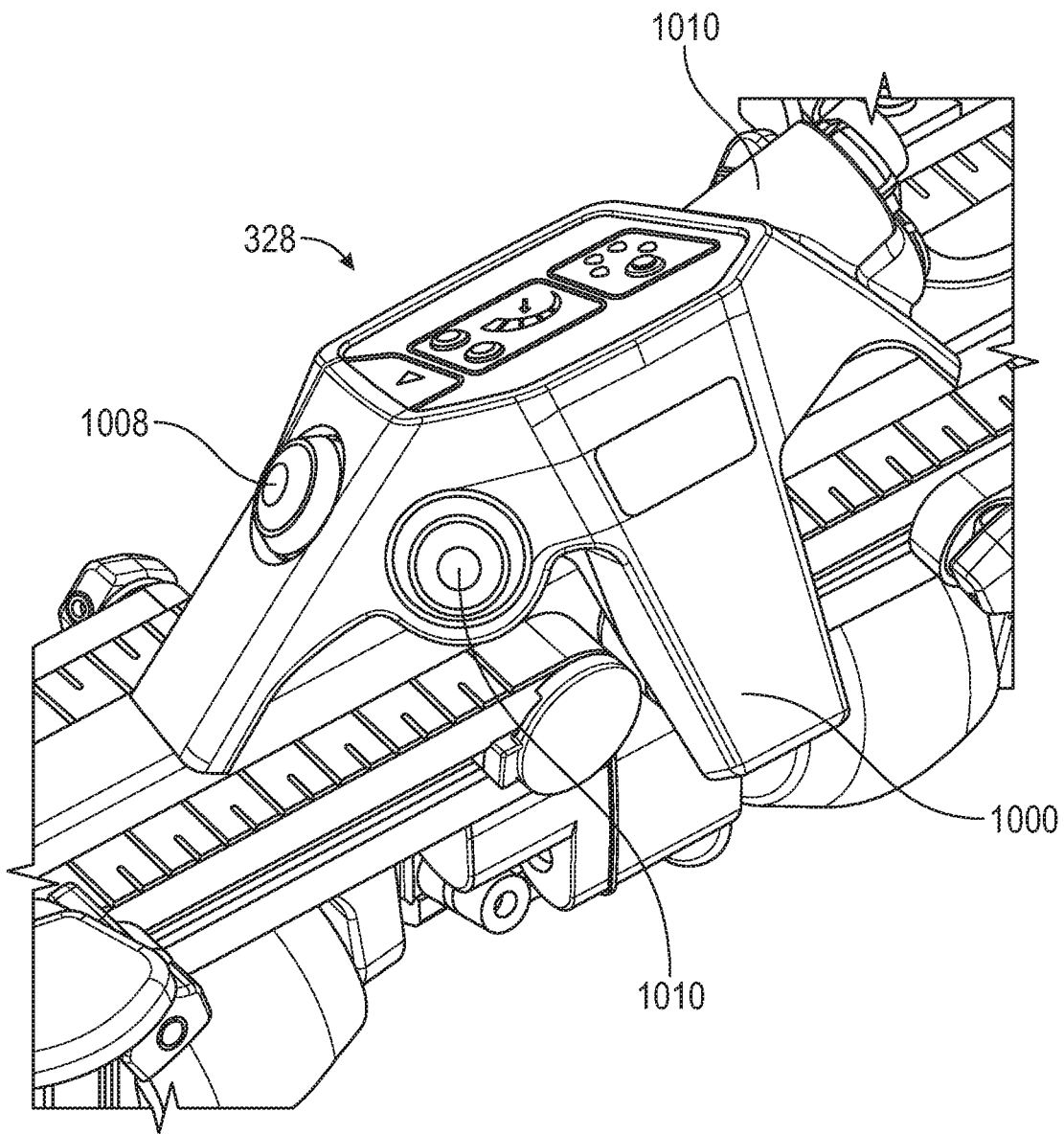
FIGS. 10A and 10B illustrate a guidance module of the ultrasonic scanning device shown with reference to FIG. 3, in accordance with the present disclosure.
Figure 10B:
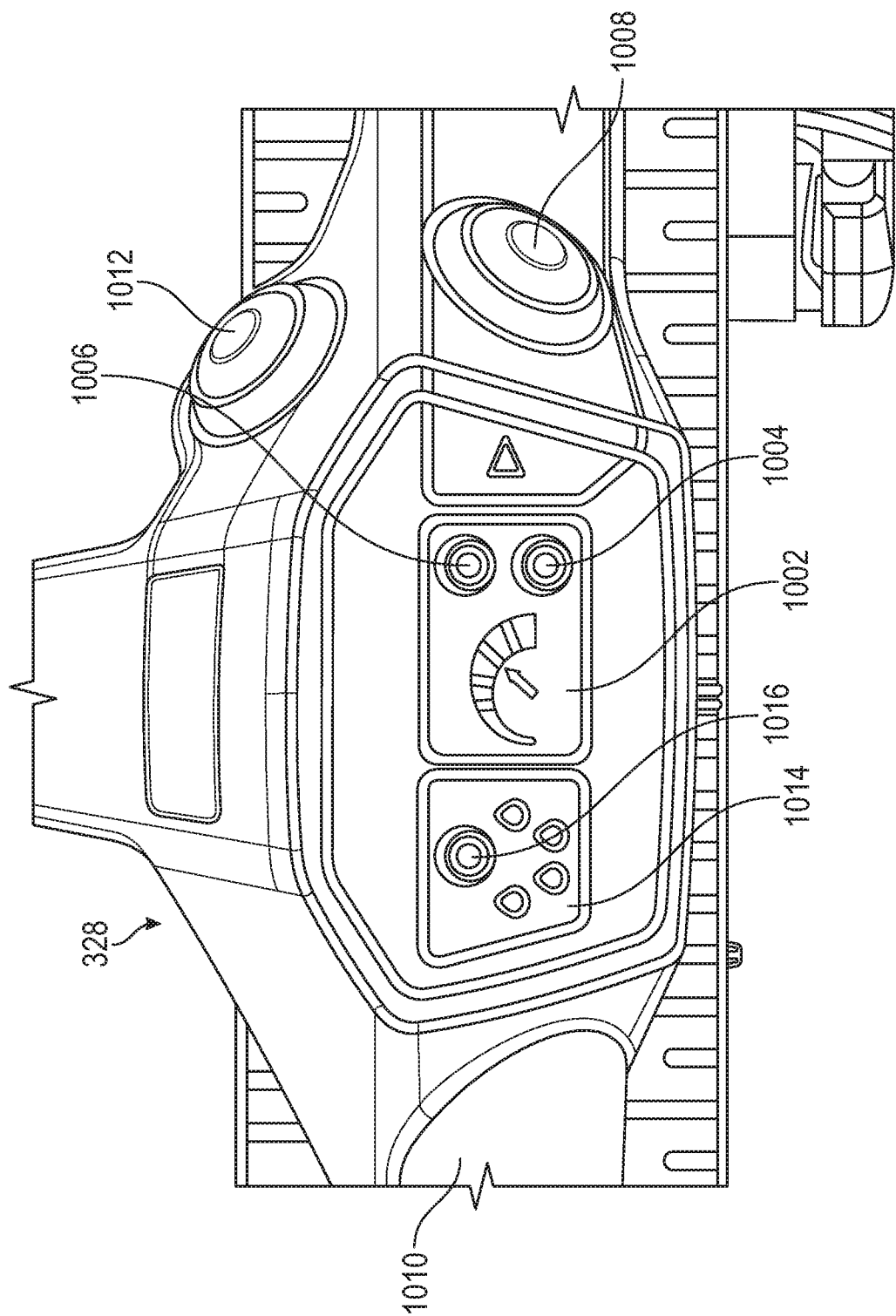

For example, making reference to FIGS. 10A and 10B, the guidance module 328 can include a laser emitter 1000 that emits a laser beam onto the weld 322. During use of the ultrasound scanning device 300, the guidance module 328 tracks a speed at which a user moves the ultrasound scanning device 300 along the weld 322. More specifically, the guidance module 328 includes a speed indicator panel 1002 that includes LEDs 1004 and 1006. During operation, one of the LEDs 1004 and 1006 can be illuminated depending on a speed with which the ultrasound scanning device 300 is moving along the article 324. To further illustrate, in an example, the LED 1004 may be red and the LED 1006 may be green. If a user is moving the ultrasound scanning device 300 too quickly, i.e., the sensors 320 and 700-706 are not able to take proper measurements of the weld 322, the guidance module 328 may illuminate the LED 1004. Here, the LED 1004 can indicate to a user of the ultrasound scanning device 300 that the ultrasound scanning device 300 should be moved at a slower speed in order to allow proper testing of the weld 322. Alternatively, if a user of the ultrasound scanning device 300 is moving the ultrasound scanning device 300 at a proper speed, the guidance module 328 can illuminate the LED 1006. It should be noted that either of the LEDs 1004 and 1006 may be illuminated based on the speed of the ultrasound scanning device 300, i.e., illuminating the LED 1006 during proper speed and illuminating the LED 1004 during improper speed. Moreover, the LEDs 1004 and 1006 may have any color in addition to red and green. The LEDs 1004 and 1006 allow for precise movement of the ultrasound scanning device 300 during testing of the article 324 with the ultrasound scanning device 300.

Moreover, the guidance module 328 can include a button 1008 that can be used to put the guidance module 328 in a data acquisition mode and take the guidance module 328 out of a data acquisition mode. As mentioned above, in an implementation, the ultrasound scanning device 300 can use ultrasonic testing to ascertain discontinuities in the weld 322. Engagement of the button 1008 can put the guidance module 328 into a data acquisition mode to allow scanning and, ultimately, based on the data gathered by the ultrasound scanning device 300, determination of any discontinuities in the article 324. Specifically, the guidance module 328 includes a port 1010 that couples with a testing device that provides an output of the inspection of the weld 322. Examples of testing devices include phased array test instruments, such as the OmniScan MX2 available from Olympus Corporation of the Americas headquartered in Center Valley, Pa.

The ultrasound scanning device 300 can also include a button 1012 that can be used to activate the laser emitter 1000 during use of the ultrasound scanning device 300. In particular, the laser emitter 1000 can be activated by the button 1012 to emit a laser beam onto the weld 322. In an implementation, the laser beam emitted onto the weld 322 forms a laser beam line 330 (FIG. 3) on the weld 322 that can be used to guide the ultrasound scanning device 300 during operation of the ultrasound scanning device 300. The button 1012 can be used to activate the formation of the laser beam line 330 onto to the weld 322.

The guidance module 328 can also include a couplant indicator panel 1014 having a LED 1016. In an implementation, the ultrasound scanning device 300 can implement a couplant during ultrasonic testing of the weld 322. In some implementations, the couplant indicator panel 1014 indicates if the ultrasound scanning device 300 is being provided with couplant. In an implementation, if the ultrasound scanning device 300 is not being provided with couplant, the couplant indicator panel 1014 may cause illumination of the LED 1016, thereby informing an operator of the ultrasound scanning device 300 that the ultrasound scanning device 300 is not being provided with couplant. In a further implementation, the couplant indicator panel 1014 may illuminate the LED 1016 to indicate that an incorrect amount of couplant is being provided to the ultrasonic scanning device 300.

Figure 11:
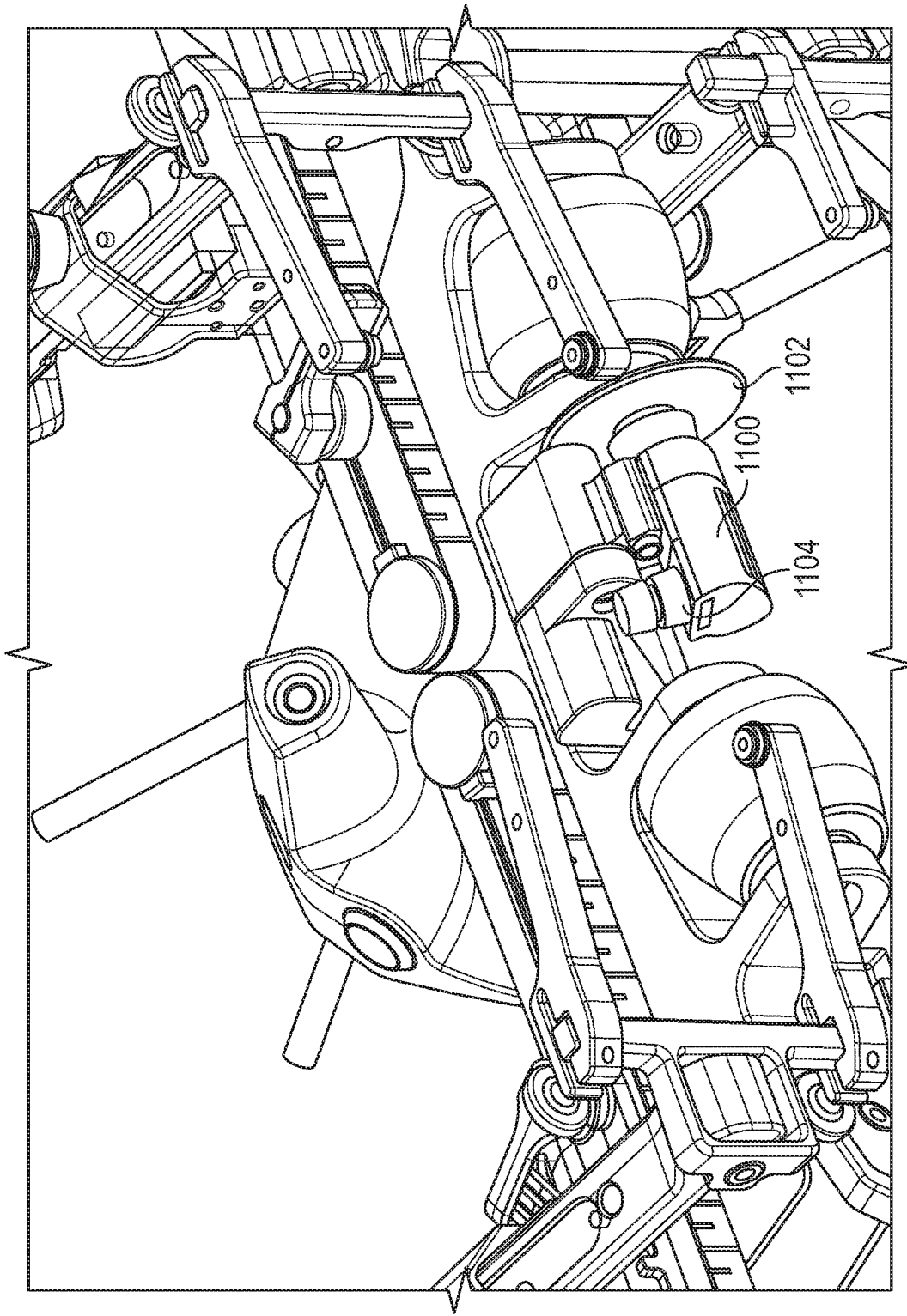
FIG. 11 shows an encoder that can be used with the ultrasonic scanning device shown with reference to FIG. 3, in accordance with the present disclosure.

In addition to the guidance module 328, the ultrasound scanning device 300 can also include an encoder 1100 as shown with regards to FIG. 11. In an implementation, the encoder 1100 can be used to position the ultrasound scanning device 300 on both the weld 322 and the article 324. The encoder 1100 can also inform a user of the ultrasound scanning device 300 a position of the ultrasound scanning device 300 on an article being scanned by the ultrasound scanning device 300. For example, if the ultrasound scanning device 300 is scanning the weld 322 of the article 324, the encoder 1100 can be used to inform a user of the ultrasound scanning device 300 how much of the weld 322 of the article 324 has been scanned by the ultrasound scanning device 300. Moreover, the encoder 1100 can dimension any discontinuities within the weld 322. The encoder 1100 can include a wheel 1102 that can be biased against the article 324 with a biasing means 1104. The wheel 1102 can be a magnetic wheel and can be similar to the wheels 308 such that the wheel 1102 can magnetically couple with the article 324 during use of the ultrasound scanning device 300. In an implementation, the biasing means 1104 can be a compression spring or any other type of means that can bias the encoder 1100 against the article 324 during use of the ultrasound scanning device 300. An example of an encoder that may be used includes the Mini-Wheel™ available from Olympus Corporation of the Americas headquartered in Center Valley, Pa.

Figure 12A:
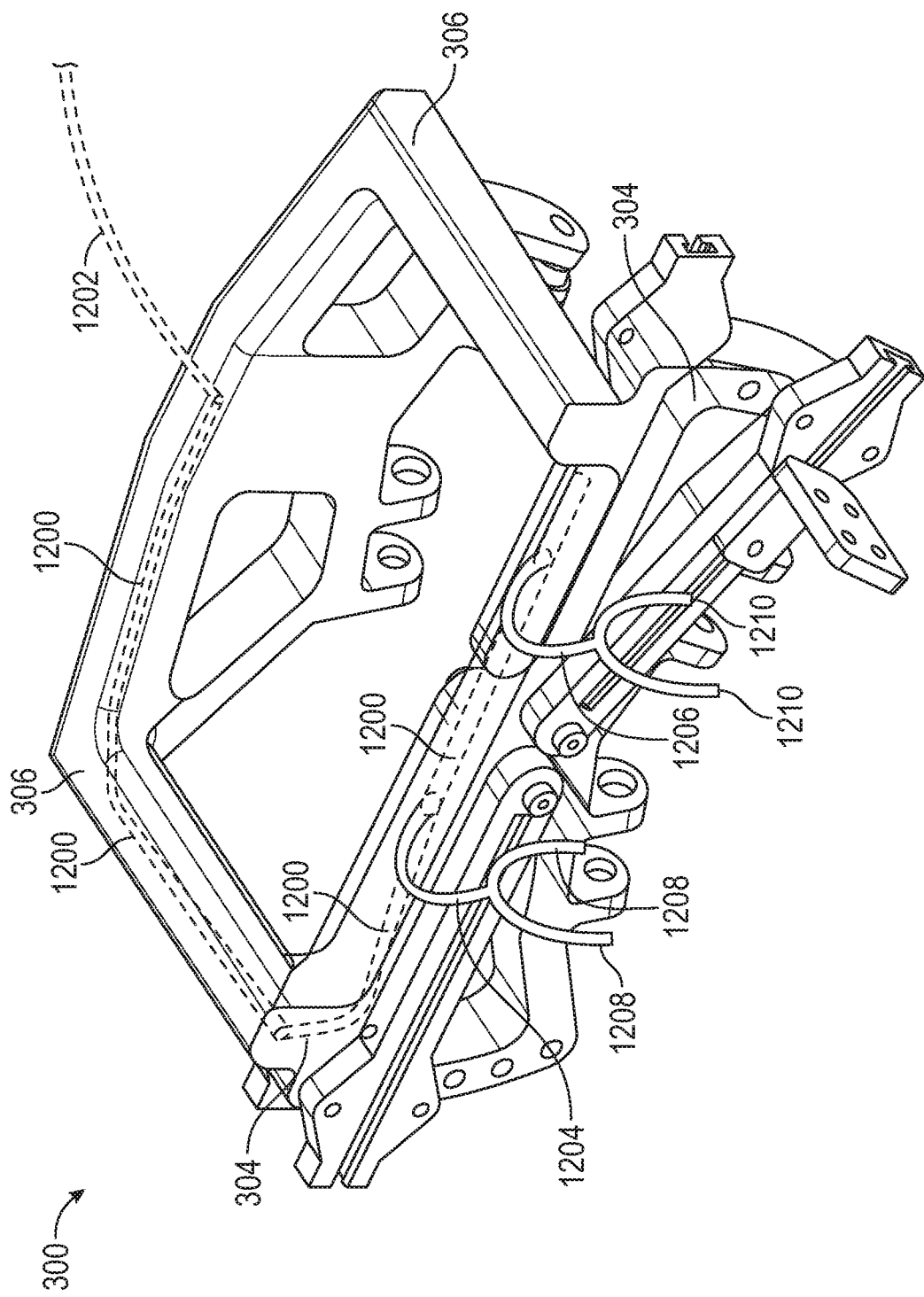
FIG. 12A illustrates couplant lines that may be used with the ultrasonic scanning device shown with reference to FIG. 3, in accordance with the present disclosure.
Figure 12B:
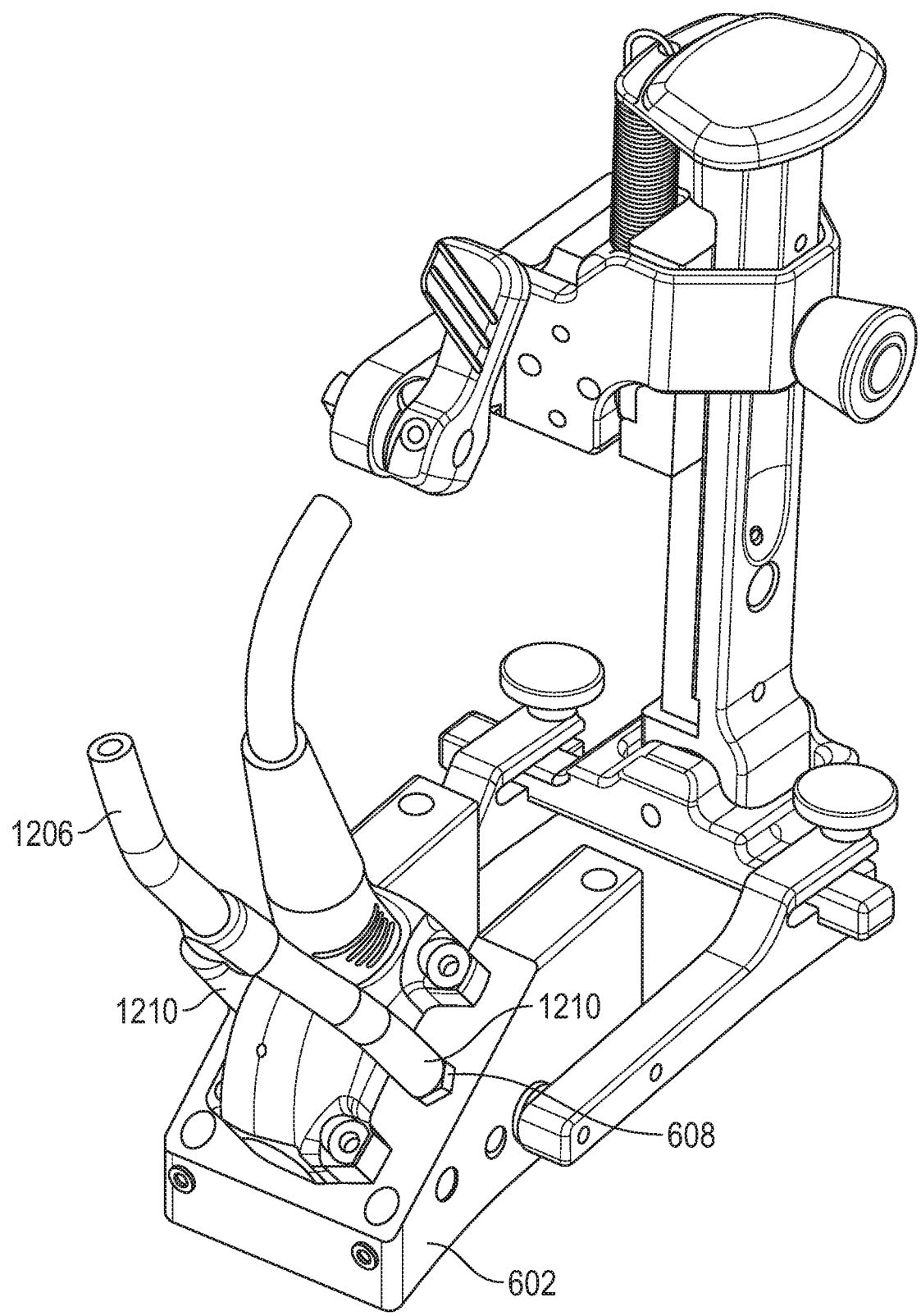
FIG. 12B illustrates the coupling of the couplant lines shown with reference to FIG. 12A with a sensor wedge, in accordance with the present disclosure.

As mentioned above, during operations involving ultrasonic testing, a couplant can be used with the sensors 320 to determine if the welds 322 have any discontinuities. In an implementation, the ultrasound scanning device 300 can have a system for providing couplant that the sensors 320 can use while performing ultrasonic testing, as shown with reference to FIGS. 12A and 12B. It should be noted that for ease of discussion, the rail arms 314, the sensor arms 316, the sensor fork 318, and the sensors 320 are not shown. In this implementation, the ultrasound scanning device 300 includes a couplant line 1200. As may be seen with reference to FIG. 12A, in an implementation, the couplant line 1200 can be disposed in both the first frame 304 and the second frame 306. The couplant line 1200 couples with a couplant source 1202, which provides couplant to the couplant lines 1200 and the ultrasound scanning device 300. Examples of couplant can include water, gel, or oil. The couplant line 1200 may be formed of resin, nylon, plastic, rubber, or any material that is resistant to liquids. Moreover, the couplant line 1200 may be tubing formed from any type of liquid resistant material, such as nylon, thermoplastic, or the like. During formation of the ultrasound scanning device 300, the couplant line 1200 may be formed along with the ultrasound scanning device 300. More specifically, the frame 302 along with the first frame portion 304 and the second frame portion 306 can be formed with a 3D printing procedure where the frame 302 and the frame portions 304 and 306 are formed from nylon. During the 3D procedure used to form the frame 302 along with the first frame portion 304 and the second frame portion 306, the couplant line 1200 can also formed. Furthermore, the frame 302 along with the first frame portion 304 and the second frame portion 306 may be formed using other techniques, such as casting, injection molding, or any other suitable technique. The couplant line 1200 can also be formed with the same technique used to form the frame 302, the first frame portion 304, and the second frame portion 306, such as casting, injection molding, or any other suitable technique. In these implementations, the couplant line 1200 can be integral with the frame 302, the first frame portion 304, and the second frame portion 304.

As noted above, the couplant line 1200 ultimately provides couplant that the sensors 320 can use during ultrasonic testing. Specifically, the couplant line 1200 provides couplant to the sensor wedge 602, which disperses the couplant on the weld 322 and the article 324 during operation of the ultrasound scanning device 300. The ultrasound scanning device 300 can include couplant lines 1204 and 1206 in fluid communication with the couplant line 1200. Moreover, in an implementation, the couplant line 1204 can be coupled to couplant line branches 1208, that can couple to the sensor wedge 602. Furthermore, the couplant line 1206 can be coupled to couplant line branches 1210 that can couple to another sensor wedge 602. Therefore, couplant from the couplant source 1202 can be provided to the sensor wedges 602 for use with sensors 320 via the couplant lines 1200, 1204, and 1206 and the couplant line branches 1208 and 1210. In an implementation, the couplant lines 1200, 1204, and 1206 and the couplant line branches 1208 and 1210 form a couplant assembly for the ultrasound scanning device 300. As shown with reference to FIG. 12B, in an embodiment, the couplant line branches 1210 couple with the sensor wedge 602 and the couplant ports 608, thereby allowing the flow of couplant through the sensor wedge 602 during ultrasonic testing of the ultrasound scanning device 300.

The above detailed description includes references to the accompanying drawings, which form a part of the detailed description. The drawings show, by way of illustration, specific examples in which the invention can be practiced. These examples are also referred to herein as examples. Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In this document, the terms a or an are used, as is common in patent documents, to include one or more than one, independent of any other instances or usages of at least one or one or more. In this document, the term or is used to refer to a nonexclusive or, such that A or B includes A but not B, B but not A, and A and B, unless otherwise indicated. In this document, the terms including and in which are used as the plain-English equivalents of the respective terms comprising and wherein. Also, in the following claims, the terms including and comprising are open-ended, that is, a system, device, article, composition, formulation, or process that includes elements in addition to those listed after such a term in a claim are still deemed to fall within the scope of that claim. Moreover, in the following claims, the terms first, second, and third, etc. are used merely as labels, and are not intended to impose numerical requirements on their objects.

The above description is intended to be illustrative, and not restrictive. For example, the above-described examples (or one or more aspects thereof) may be used in combination with each other. Other examples can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed example. Thus, the following claims are hereby incorporated into the Detailed Description as examples or examples, with each claim standing on its own as a separate example, and it is contemplated that such examples can be combined with each other in various combinations or permutations. The scope of the invention should be determined with reference to the appended claims, along with the full scope of equivalents to which such claims are entitled.

What is claimed:
1. An ultrasound scanning device comprising:
a frame having a first frame portion and a second frame portion independently pivoting about a coupling between the first frame portion and the second frame portion;
a first set of wheels coupled with the first frame portion;
a second set of wheels coupled with the second frame portion;
a rail movably disposed on the first frame portion and including a channel;

at least two rail arms operatively coupled with the channel, the at least two rail arms each respectively comprising a sensor assembly, the sensor assembly comprising:
a sensor fork;
a sensor coupled with the sensor fork; and
a sensor arm, the sensor arm being coupled with the sensor fork at a distal end of the sensor arm and being coupled with the rail arm at a proximal end of the sensor arm, wherein the sensor is adjustable between a first position and a second position via the rail.

2. The ultrasound scanning device of claim 1, wherein the sensor is oriented to scan an article in an axial direction when the second frame portion is in a first position relative to the first frame portion and the frame adjustment assembly includes a knob having a knob shaft and a lock having a first lock positioner and a second lock positioner where the second frame portion is in the first position relative to the first frame portion when the knob shaft is located within the first lock positioner.

3. The ultrasound scanning device of claim 2, wherein the sensor is oriented to scan the article in a circumferential direction when the second frame portion is in a second position relative to the first frame portion, the second frame portion being in the second position relative to the first frame portion when the knob shaft is located within the second lock positioner.

4. The ultrasound scanning device of claim 1, wherein the rail arm includes a rail arm frame and the sensor arm is disposed within the frame and a tension spring couples the sensor arm with the frame.

5. The ultrasound scanning device of claim 1, wherein the sensor is a phased array sensor.

6. The ultrasound scanning device of claim 1, wherein the sensor is a time-of-flight diffraction sensor.

7. The ultrasound scanning device of claim 1, wherein the ultrasound scanning device further includes a wheel encoder disposed on the first frame portion.

8. The ultrasound scanning device of claim 1, further comprising a guidance module disposed on the frame, the guidance module including at least one light-emitting indicator to indicate a speed of the ultrasound scanning device during use of the ultrasound scanning device.

9. The ultrasound scanning device of claim 8, wherein the guidance module further includes a light emitting indicator configured to indicate an amount of couplant provided to the ultrasound scanning device during use of the ultrasound scanning device.

10. An ultrasound scanning device comprising:
a frame having a first frame portion and a second frame portion independently pivoting about a coupling between the first frame portion and the second frame portion;
a first set of wheels coupled with the first frame portion;
a second set of wheels coupled with the second frame portion;
a rail movably disposed on the first frame portion and including a channel;
a first rail arm operatively coupled with the channel, the first rail arm comprising:
a first sensor assembly, the first sensor assembly comprising:
a first sensor fork;
a first sensor coupled with the first sensor fork; and
a first sensor arm, the first sensor arm being coupled with the first sensor fork at a distal end of the first sensor arm and being coupled with the rail arm at a proximal end of the first sensor arm; and
a second rail arm operatively coupled with the channel, the second rail arm comprising:
a second sensor assembly, the second sensor assembly comprising:
a second sensor fork;
a second sensor coupled with the second sensor fork; and
a second sensor arm, the second sensor arm being coupled with the second sensor fork at a distal end of the second sensor arm and being coupled with the rail arm at a proximal end of the second sensor arm, wherein the second sensor is adjustable between a first position and a second position via the rail.

11. The ultrasound scanning device of claim 10, wherein each of the first sensor and the second sensor are respectively oriented to scan an article in an axial direction when the second frame portion is in a first position relative to the first frame portion.

12. The ultrasound scanning device of claim 11, wherein the frame adjustment assembly includes a knob having a knob shaft and a lock having a first lock positioner and a second lock positioner where the second frame portion is in the first position relative to the first frame portion when the knob shaft is located within the first lock positioner.

13. The ultrasound scanning device of claim 12, wherein each of the first sensor and the second sensor are respectively oriented to scan the article in a circumferential direction when the second frame portion is in a second position relative to the first frame portion, the second frame portion being in the second position relative to the first frame portion when the knob shaft is located within the second lock positioner.

14. The ultrasound scanning device of claim 10, wherein the rail arm includes a rail arm frame and one of the first sensor arm and the second sensor arm is disposed within the frame and a tension spring couples the sensor arm with the frame.

15. The ultrasound scanning device of claim 10, wherein the first sensor is a phased array sensor and second sensor is a time-of-flight diffraction sensor.

16. The ultrasound scanning device of claim 10, wherein each of the first sensor and the second sensor are a phased array sensor.

17. The ultrasound scanning device of claim 10, wherein the ultrasound scanning device further includes a wheel encoder disposed on the first frame portion.

18. The ultrasound scanning device of claim 10, further comprising a guidance module disposed on the frame, the guidance module including at least one light-emitting indicator configured to indicate a speed of the ultrasound scanning device during use of the ultrasound scanning device.

19. The ultrasound scanning device of claim 18, wherein the guidance module further includes a light-emitting indicator configured to indicate an amount of couplant provided to the ultrasound scanning device during use of the ultrasound scanning device.

20. An ultrasound scanning device comprising:
a frame having a first frame portion and a second frame portion independently pivoting about a coupling between the first frame portion and the second frame portion;
a frame adjustment assembly including:
a knob having a knob shaft; and a lock having a first lock positioner and a second lock positioner where the second frame portion is in a first position relative to the first frame portion when the knob shaft is located within the first lock positioner and the second frame portion is in a second position relative to the first frame portion when the knob shaft is located within the second lock positioner;

a first set of wheels coupled with the first frame portion;

a second set of wheels coupled with the second frame portion;

a rail movably disposed on the first frame portion and including a channel;

at least two rail arms operatively coupled with the channel, the at least two rail arms each respectively comprising a sensor assembly, the sensor assembly comprising:
  a sensor fork;
  a sensor coupled with the sensor fork; and
  a sensor arm, the sensor arm being coupled with the sensor fork at a distal end of the sensor arm and being coupled with the rail arm at a proximal end of the sensor arm, wherein the sensor is adjustable between a first position and a second position via the rail.

21. The ultrasound scanning device of claim 1, wherein a first sensor of the at least two rail arms is configurable to be adjustable into the first position while a second sensor of the at least two rail arms is configurable to be adjustable into the second position such that the first and second sensors are independently positionable.

22. The ultrasound scanning device of claim 10, wherein the first sensor is configurable to be adjustable into the first position while the second sensor is configurable to be adjustable into the second position such that the first and second sensors are independently positionable.

23. The ultrasound scanning device of claim 20, wherein a first sensor of the at least two rail arms is configurable to be adjustable into the first position while a second sensor of the at least two rail arms is configurable to be adjustable into the second position such that the first and second sensors are independently positionable.

\* \* \* \* \*